(12) United States Patent
Park et al.

(10) Patent No.: US 12,322,149 B2
(45) Date of Patent: Jun. 3, 2025

(54) ELECTRONIC DEVICE FOR IMPLEMENTING METAVERSE ENVIRONMENT USING DRAWING MOTION AND METHOD FOR OPERATING THE SAME

(71) Applicants: WOONGJIN THINKBIG CO., LTD., Paju-si (KR); ARTYGENSPACE CO., LTD., Seoul (KR)

(72) Inventors: Jeongwook Park, Paju-si (KR); Hwanseok Choi, Paju-si (KR); Hyojin Kim, Paju-si (KR); Jungwoo Choi, Seoul (KR); Youngsun Seo, Seoul (KR)

(73) Assignees: WOONGJIN THINKBIG CO., LTD., Paju-si (KR); ARTYGENSPACE CO., LTD., Seoul (KR)

( * ) Notice: Subject to any disclaimer, the term of this patent is extended or adjusted under 35 U.S.C. 154(b) by 674 days.

(21) Appl. No.: 17/720,790

(22) Filed: Apr. 14, 2022

(65) Prior Publication Data
US 2023/0215127 A1 Jul. 6, 2023

(30) Foreign Application Priority Data

Dec. 30, 2021 (KR) .......... 10-2021-0193210
Mar. 22, 2022 (KR) .......... 10-2022-0035125

(51) Int. Cl.
*G06V 10/20* (2022.01)
*G06T 11/20* (2006.01)
(Continued)

(52) U.S. Cl.
CPC .......... *G06V 10/255* (2022.01); *G06T 11/203* (2013.01); *G06T 13/80* (2013.01); *G06T 19/006* (2013.01); *G06V 10/761* (2022.01)

(58) Field of Classification Search
CPC .. G06V 10/255; G06V 10/761; G06V 10/225; G06V 10/56; G06V 10/44;
(Continued)

(56) References Cited

U.S. PATENT DOCUMENTS 6,954,728 B1 10/2005 Kusumoto et al.
7,348,978 B2 * 3/2008 Nagata .................... G06T 15/20
                                                             345/619

(Continued)

FOREIGN PATENT DOCUMENTS

KR   10-0912264 B1   8/2009
KR   10-1221169      1/2013
(Continued)

OTHER PUBLICATIONS

Korean Office Action dated Jan. 10, 2023, issued in Korean Patent Application No. 10-2022-0035125.
(Continued)

*Primary Examiner* — Charles T Shedrick
(74) *Attorney, Agent, or Firm* — Jefferson IP Law, LLP

(57) ABSTRACT

A method for operating an electronic device is provided. The method comprises displaying, on a display, a content including at least one area where a graphic object may be placed, obtaining at least one image, identifying a line drawing and at least one marker, based on the at least one image, identifying a first graphic object corresponding to the identified line drawing and the at least one identified marker among a plurality of pre-stored graphic objects, and displaying the first graphic object on a first area of the content corresponding to a position of at least one of the line drawing or the at least one marker.

12 Claims, 25 Drawing Sheets

(51) Int. Cl.
*G06T 13/80* (2011.01)
*G06T 19/00* (2011.01)
*G06V 10/74* (2022.01)

(58) Field of Classification Search
CPC ..... G06T 11/203; G06T 13/80; G06T 19/006; G06F 3/0481
See application file for complete search history.

(56) References Cited

U.S. PATENT DOCUMENTS

| | | |
|---|---|---|
| 7,882,222 B2 | 2/2011 | Dolbier et al. |
| 11,073,917 B1 * | 7/2021 | Choi ..................... G09B 17/003 |
| 12,019,850 B2 * | 6/2024 | Chanda ................. G06F 3/0482 |
| 2009/0077161 A1 | 3/2009 | Hamilton et al. |
| 2010/0321540 A1 | 12/2010 | Woo et al. |
| 2011/0141501 A1 * | 6/2011 | Shirata ..................... H04N 1/60 |
| | | 358/1.9 |
| 2012/0075484 A1 * | 3/2012 | Kawamoto ........... G06T 19/006 |
| | | 348/207.1 |
| 2012/0218299 A1 * | 8/2012 | Hayakawa ........... A63F 13/655 |
| | | 348/207.1 |
| 2013/0257907 A1 * | 10/2013 | Matsui ..................... G06T 7/74 |
| | | 345/633 |
| 2016/0103830 A1 * | 4/2016 | Cheong ................. G06F 16/745 |
| | | 715/738 |
| 2017/0095737 A1 * | 4/2017 | Nishikawa .............. A63F 13/35 |
| 2019/0279407 A1 | 9/2019 | McHugh et al. |
| 2021/0064858 A1 * | 3/2021 | Batra ....................... G06N 3/08 |
| 2021/0264681 A1 * | 8/2021 | Kitamura .............. G06T 11/203 |
| 2024/0078352 A1 * | 3/2024 | Krauthamer ........... G06F 30/13 |

FOREIGN PATENT DOCUMENTS

| | | |
|---|---|---|
| KR | 10-1678994 B1 | 11/2016 |
| KR | 10-2019-0106769 A | 9/2019 |
| KR | 10-2020-0060202 A | 5/2020 |
| KR | 10-2020-0066130 A | 6/2020 |
| KR | 10-2222599 B1 | 3/2021 |
| KR | 10-2297708 B1 | 9/2021 |

OTHER PUBLICATIONS

Korean Decision on Grant dated May 25, 2023, issued in Korean Patent Application No. 10-2022-0035125.

* cited by examiner

ELECTRONIC DEVICE FOR IMPLEMENTING METAVERSE ENVIRONMENT USING DRAWING MOTION AND METHOD FOR OPERATING THE SAME

CROSS-REFERENCE TO RELATED APPLICATION(S)

This application is based on and claims priority under 35 U.S.C. § 119(a) of a Korean patent application number 10-2021-0193210, filed on Dec. 30, 2021, in the Korean Intellectual Property Office, and of a Korean patent application number 10-2022-0035125, filed on Mar. 22, 2022, in the Korean Intellectual Property Office, the disclosures of each of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) WOONGJIN THINKBIG CO., LTD., and 2) ARTYGENSPACE CO., LTD.

TECHNICAL FIELD

The disclosure relates to an electronic device for implementing a metaverse environment using a drawing motion and a method for operating the same.

DESCRIPTION OF RELATED ART

A metaverse or extended virtual world is a virtual space and is a world which provides the function of interaction between a virtual world and the real world to perform social, economic, and cultural activities closely related to reality to thereby create values.

With an increasing interest in metaverse, an effort has been made to implement metaverse technology in various industries for purposes of politics, administration, business operation, marketing, advertisement, and education.

It is proposed to provide, through an electronic device, a service for experiencing various industry fields in the real world by way of metaverse technology.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide an electronic device and a method for operating the same, which may enhance the user's immersion to a metaverse space by implementing a metaverse space using markers placed by the user and a drawing made by the user and placing graphic objects on the metaverse space to thereby lead to interaction between reality and the virtual space and a method for operating the same.

In accordance with an aspect of the disclosure, a method for operating an electronic device is provided. The method comprises displaying, on a display, a content including at least one area where a graphic object may be placed, obtaining at least one image, identifying a line drawing and at least one marker, based on the at least one image, identifying a first graphic object corresponding to the identified line drawing and the at least one identified marker among a plurality of pre-stored graphic objects, and displaying the first graphic object on a first area of the content corresponding to a position of at least one of the line drawing or the at least one marker.

In accordance with another aspect of the disclosure, a non-transitory computer-readable medium storing a program code executable by a processor is provided. The program code, when executed, enables the processor to display, on a display, a content including at least one area where a graphic object may be placed, obtain at least one image, identify a line drawing and at least one marker, based on the at least one image, identify a first graphic object corresponding to the identified line drawing and the at least one identified marker among a plurality of pre-stored graphic objects, and display the first graphic object on a first area of the content corresponding to a position of at least one of the line drawing or the at least one marker.

In accordance with another aspect of the disclosure, the electronic device and the method for operating the same may enhance the user's immersion to a metaverse space by implementing a metaverse space using markers placed by the user and a drawing made by the user and placing graphic objects on the metaverse space to thereby lead to interaction between reality and the virtual space and a method for operating the same.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
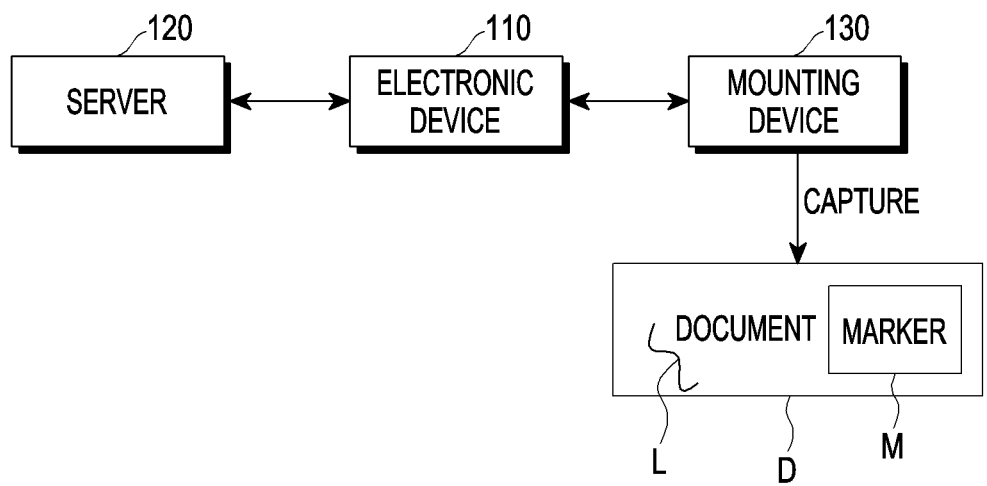
FIG. 1 is a view illustrating an example of devices included in a metaverse environment implementation system according to an embodiment.

According to an embodiment, there may be provided a method for operating an electronic device, comprising displaying, on a display, a content including at least one area where a graphic object may be placed, obtaining at least one image, identifying a line drawing and at least one marker, based on the at least one image, identifying a first graphic object corresponding to the identified line drawing and the at least one identified marker among a plurality of pre-stored graphic objects, and displaying the first graphic object on a first area of the content corresponding to a position of at least one of the line drawing or the at least one marker.

According to an embodiment, there may be provided the method, wherein the electronic device stores information about a first line drawing and at least one first marker associated with each of the plurality of graphic objects, and wherein the method further comprises identifying the first graphic object among the plurality of graphic objects based on comparison between the information about the first line drawing and the at least one first marker and the information about the line drawing and the at least one marker.

According to an embodiment, there may be provided the method further comprising identifying the line drawing and the at least one marker from the at least one image, identifying a first line drawing and a first marker, meeting a designated condition associated with an overlapping area of the line drawing and the at least one marker, and identifying a first graphic object corresponding to the first line drawing and the first marker among the plurality of pre-stored graphic objects.

According to an embodiment, there may be provided the method further comprising determining whether there is a figure defined by the identified line drawing, identifying a first graphic object corresponding to the at least one identified marker and the figure defined by the identified line drawing among the plurality of pre-stored graphic objects when the figure exists, and identifying a first figure associated with the line drawing and displaying information about the first figure when the figure does not exist.

According to an embodiment, there may be provided the method, wherein identifying the first graphic object corresponding to the at least one identified marker and the figure defined by the identified line drawing includes determining a similarity between the figure and the first figure associated with each of the plurality of pre-stored graphic objects, identifying at least one second graphic object having the first figure determined to have the similarity larger than a preset value, and identifying the first graphic object corresponding to the at least one marker among the at least one second graphic object.

According to an embodiment, there may be provided the method further comprising, when the first graphic object includes a plurality of third graphic objects, displaying information about a second figure more specific than the first figure, associated with each of the plurality of third graphic object, wherein the respective second figures of the plurality of third graphic object differ from each other, obtaining at least one first image after displaying the information about the second figure, identifying a second line drawing based on the at least one first image, and identifying a fourth object associated with the second line drawing among the plurality of third graphic objects.

According to an embodiment, there may be provided the method further comprising obtaining at least one first image after displaying the first graphic object, identifying at least one color marker placed on the line drawing from the at least one first image, and setting a color of the first graphic object based on the at least one identified color marker.

According to an embodiment, there may be provided the method further comprising identifying a position of the at least one color marker placed on the line drawing and setting the color of a portion of the first graphic object corresponding to the position.

According to an embodiment, there may be provided the method further comprising obtaining at least one second image after displaying the first graphic object, identifying a character marker from the at least one second image and displaying a virtual avatar corresponding to the character marker on the content, and when a position of the character marker corresponds to the line drawing, applying an animation effect associated with the first graphic object to the virtual avatar.

According to an embodiment, there may be provided the method further comprising determining the animation effect based on information about the at least one marker.

According to an embodiment, there may be provided the method further comprising registering the content with a server, wherein an authority for using the first graphic object is set, identifying access, to the content, of an external electronic device, receiving a purchase request for the first graphic object by the external electronic device, and selling the first graphic object based on the purchase request, wherein the authority for using the first graphic object is set to the external electronic device.

According to an embodiment, there may be provided a non-transitory computer-readable medium storing a program code executable by a processor, wherein when executed, the program code enables the processor to display, on a display, a content including at least one area where a graphic object may be placed, obtain at least one image, identify a line drawing and at least one marker, based on the at least one image, identify a first graphic object corresponding to the identified line drawing and the at least one identified marker among a plurality of pre-stored graphic objects, and display the first graphic object on a first area of the content corresponding to a position of at least one of the line drawing or the at least one marker.

According to an embodiment, there may be provided the non-transitory computer-readable medium, storing information about a first line drawing and at least one first marker associated with each of the plurality of graphic objects, and wherein when executed, the program code enables the processor to identify the first graphic object among the plurality of graphic objects based on comparison between the information about the first line drawing and the at least one first marker and the information about the line drawing and the at least one marker.

According to an embodiment, there may be provided the non-transitory computer-readable medium, wherein when executed, the program code enables the processor to identify the line drawing and the at least one marker from the at least one image, identify a first line drawing and a first marker, meeting a designated condition associated with an overlapping area of the line drawing and the at least one marker, and identify a first graphic object corresponding to the first line drawing and the first marker among the plurality of pre-stored graphic objects.

According to an embodiment, there may be provided the non-transitory computer-readable medium, wherein when executed, the program code enables the processor to determine whether there is a figure defined by the identified line drawing, identify a first graphic object corresponding to the at least one identified marker and the figure defined by the identified line drawing among the plurality of pre-stored graphic objects when the figure exists, and identify a first figure associated with the line drawing and displaying information about the first figure when the figure does not exist.

According to an embodiment, there may be provided the non-transitory computer-readable medium, wherein when executed, the program code enables the processor to, as at least part of identifying the first graphic object corresponding to the at least one identified marker and the figure defined by the identified line drawing, determine a similarity between the figure and the first figure associated with each of the plurality of pre-stored graphic objects, identify at least one second graphic object having the first figure determined to have the similarity larger than a preset value, and identify the first graphic object corresponding to the at least one marker among the at least one second graphic object.

According to an embodiment, there may be provided the non-transitory computer-readable medium, wherein when executed, the program code enables the processor to, when the first graphic object includes a plurality of third graphic objects, display information about a second figure more specific than the first figure, associated with each of the plurality of third graphic object, wherein the respective second figures of the plurality of third graphic object differ from each other, obtain at least one first image after displaying the information about the second figure, identify a second line drawing based on the at least one first image, and identify a fourth object associated with the second line drawing among the plurality of third graphic objects.

According to an embodiment, there may be provided the non-transitory computer-readable medium, wherein when executed, the program code enables the processor to obtain at least one first image after displaying the first graphic object, identify at least one color marker placed on the line drawing from the at least one first image, and set a color of the first graphic object based on the at least one identified color marker.

According to an embodiment, there may be provided the non-transitory computer-readable medium, wherein when executed, the program code enables the processor to identify a position of the at least one color marker placed on the line drawing and set the color of a portion of the first graphic object corresponding to the position.

According to an embodiment, there may be provided the non-transitory computer-readable medium, wherein when executed, the program code enables the processor to obtain at least one second image after displaying the first graphic object, identify a character marker from the at least one second image and display a virtual avatar corresponding to the character marker on the content, and when a position of the character marker corresponds to the line drawing, apply an animation effect associated with the first graphic object to the virtual avatar.

As embodiments disclosed herein are provided to provide a clear description of the spirit of the disclosure to one of ordinary skill in the art, the disclosure is not limited to the disclosed embodiments. According to various embodiments, the scope of the disclosure should be interpreted as including modifications or changes thereto without departing from the spirit of the disclosure.

Although terms commonly and widely used are adopted herein considering the functions in the disclosure, other terms may also be used depending on the intent of one of ordinary skill in the art, custom, or advent of new technology. For specific terms, their definitions may be provided. Accordingly, the terms used herein should be determined based on their meanings and the overall disclosure, rather than by the terms themselves.

The accompanying drawings are provided for a better understanding of the disclosure. Some views may be exaggerated in aid of understanding as necessary. The disclosure is not limited to the drawings.

When determined to make the gist of the disclosure unclear, a detailed description of known configurations or functions may be omitted as necessary.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

1. Metaverse Environment Implementation System

Hereinafter, according to an embodiment, a metaverse environment implementation system is described.

In the disclosure, the metaverse environment implementation system may be defined as a system that provides a function of providing a metaverse space and a function of arranging various types of graphic objects on the metaverse space according to the user's control. The metaverse space may be a virtual space realized by extending a digital-based virtual space from the real space of the real world. For example, the metaverse space is graphic content that may be displayed (or provided, or output) by an electronic device and may include a three-dimensional (3D) graphic space and an extended reality (XR) space (e.g., virtual reality (VR), augmented reality (AR), and mixed reality (MR)). Two-dimensional (2D) graphic objects and VR/AR/MR 3D graphic objects, as graphic objects, may be arranged on the metaverse space. The metaverse environment implementation system may identify at least one of line drawings made by users or markers arranged by the user and implement (or display) a specific type of graphic object corresponding to at least one of the identified line drawing or marker on the metaverse space. Thus, the user may do activities in the virtual space, like he does in the real space of the real world while interacting with the metaverse space provided by the system.

2. Configuration of Metaverse Environment Implementation System

FIG. 1 is a view illustrating an example of devices included in a metaverse environment implementation system according to an embodiment. FIG. 1 is described below with reference to FIGS. 2A and 2B.

Figure 2A:
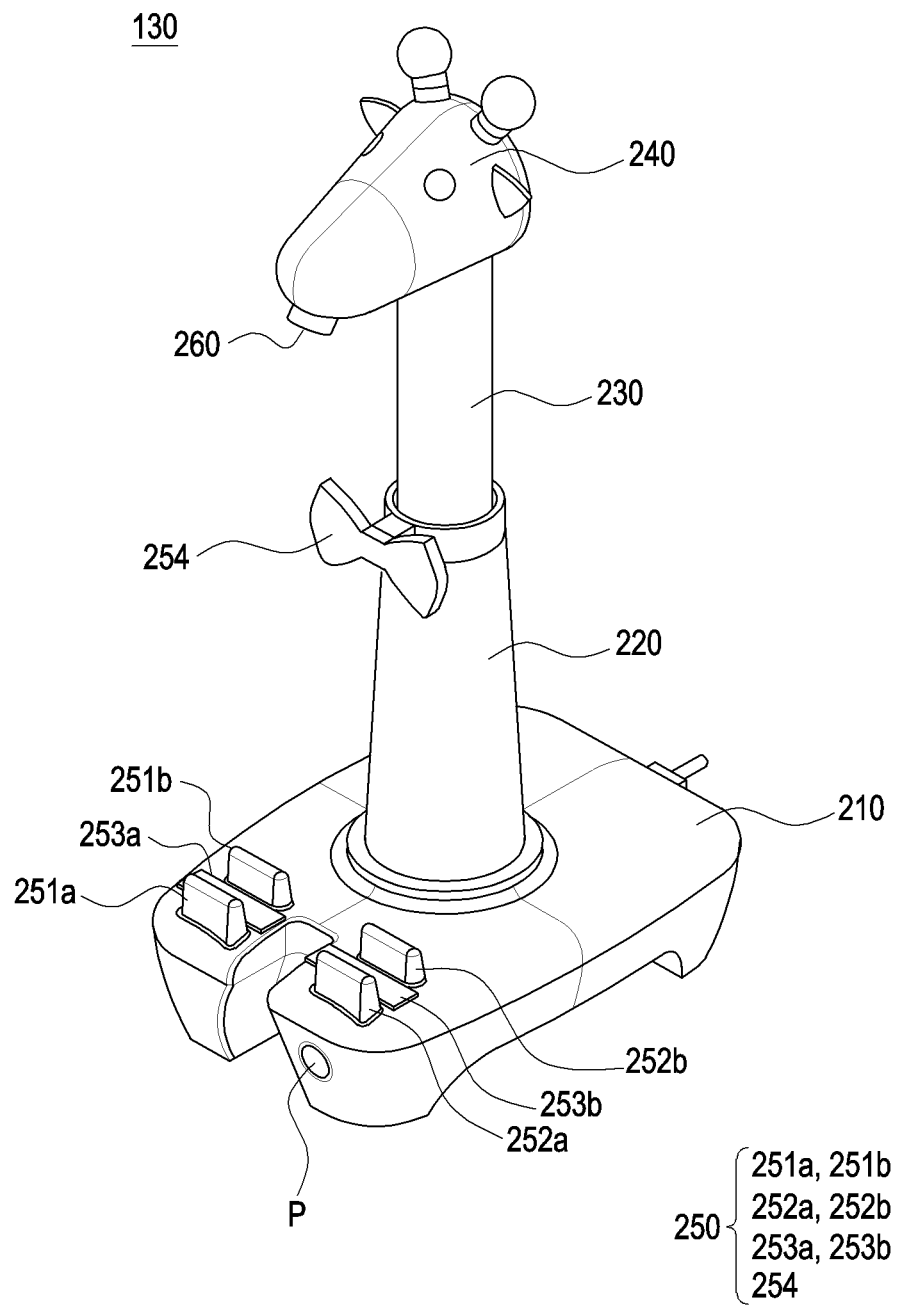
FIG. 2A is a view illustrating an example of a mounting device included in a metaverse environment implementation system according to an embodiment.
Figure 2B:
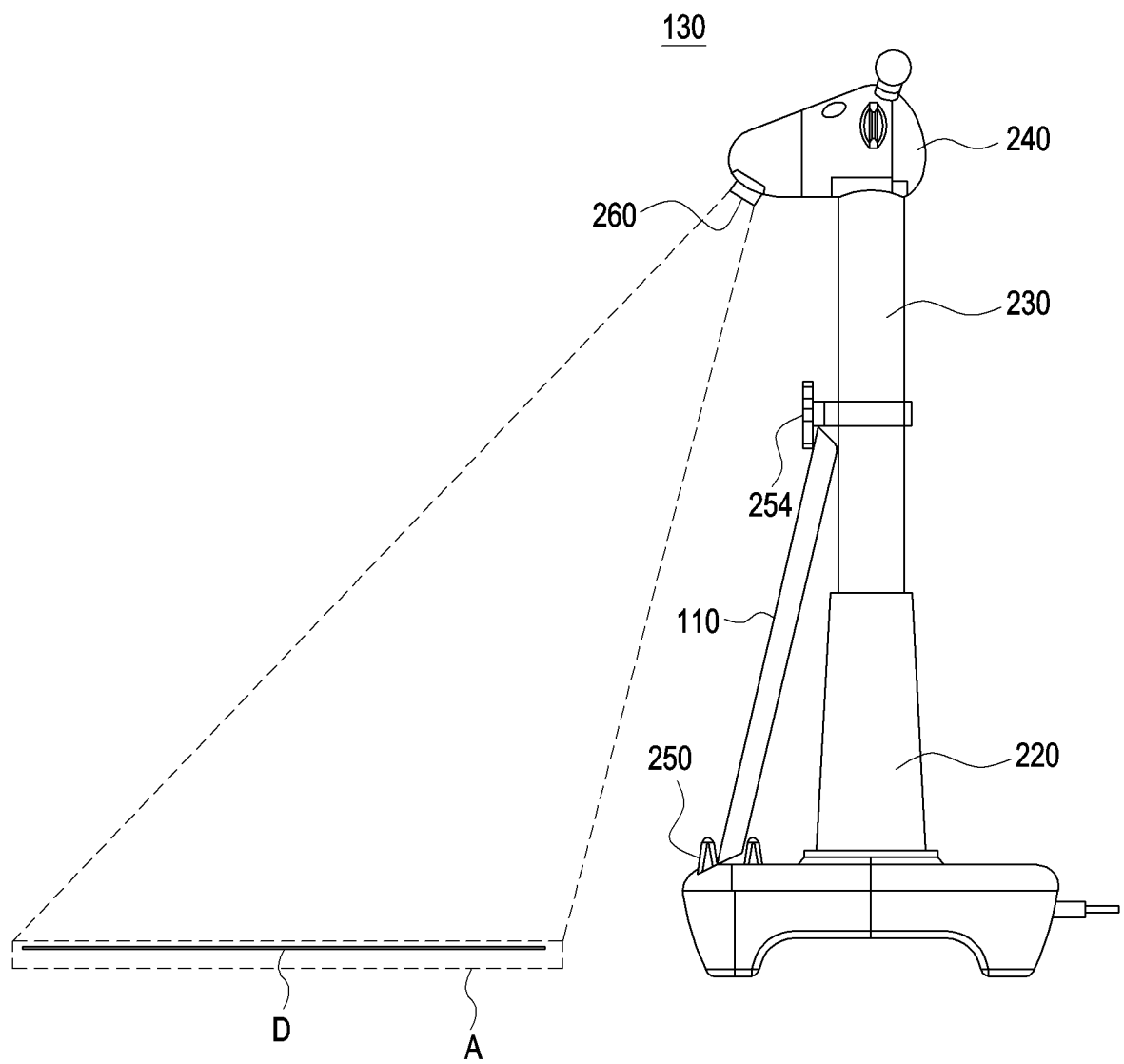
FIG. 2B is a view illustrating an example in which an electronic device is mounted on a mounting device included in a metaverse environment implementation system according to an embodiment.

FIG. 2A is a view illustrating an example of a mounting device 130 included in a metaverse environment implementing system according to an embodiment. FIG. 2B is a view illustrating an example in which an electronic device 110 is mounted on a mounting device 130 included in a metaverse environment implementing system according to an embodiment.

Referring to FIG. 1, a metaverse environment implementation system may include a server 120, an electronic device 110, and a mounting device 130. Without limited to those shown in FIG. 1, the metaverse environment implementation system may be implemented to include more or less components than the shown devices.

According to an embodiment, the metaverse environment implementation system may be implemented to provide a metaverse space and perform the operation of providing a graphic object corresponding to at least one of at least one line drawing L (or line art) drawn in a document D on the metaverse space or a marker M. For example, the document D may mean a real book and/or a plurality of pages included in the real book or, without limited to those described and/or shown, may be implemented as an electronic document displayed on a display of a predetermined device, a sheet of paper, and/or a booklet, not a real book, or various types of documents where a line drawings L may be drawn. The line drawing L may mean a target represented as a line as the user draws on the document. The marker M may be a flat plate-shaped object previously implemented to be placeable on the document D, and various types of markers M may be included. As an example, the marker M may include an object marker implemented to represent various objects (e.g., electronic products, such as refrigerators, TVs, or computers, machines, such as vehicles, buildings, or natural objects, such as trees, flowers, humans, or animals) implemented in a real-world space. The marker M may be implemented to include a flat plate-shaped body where an image representing various objects is drawn on the upper surface thereof. As another example, the marker M may include a color marker implemented to represent a specific color. The marker M may be implemented to include a flat plate-shaped body whose upper surface is colored in a specific color.

According to an embodiment, the electronic device 110 may be implemented to display content corresponding to the metaverse space and to display a graphic object on the displayed content. As shown in FIG. 2B, the electronic device 110 may be mounted (or seated or supported) on the mounting device 130, and the electronic device 110 may be electrically (or operatively) connected with the mounting device 130 while being mounted on the mounting device 130. Accordingly, the electronic device 110 may identify at least one of the line drawing L drawn on the document D by the user or the marker M based on analysis of the image including the document D (e.g., a real book) captured by the mounting device 130, obtained from the mounting device 130, and display the graphic object corresponding to at least one of the identified line drawing L or marker M on the content corresponding to the metaverse space. The electronic device 110 may previously store information about various types of graphic objects corresponding to the line drawing L or the marker M, which is described below in detail.

According to an embodiment, the electronic device 110 may be a type of device available to the user. For example, the electronic device 110 may be a tablet PC as shown in FIG. 2B but, without limited to those described and/or shown, the electronic device 110 may be implemented as a type of electronic device 110 mountable (or operably connected with) on the electronic device 110, e.g., a smartphone.

According to an embodiment, the mounting device 130 may be a device for mounting the electronic device 110 and capturing the document D. Referring to FIG. 2A, the mounting device 130 may include a body 210, a supporting post 220, an elevating post 230, a head 240, mounting structures 250 for mounting the electronic device 110, and a power button 200 for turning on the mounting device 130.

Referring to FIG. 2A, the body 210 of the mounting device 130 may include supporting protrusions 251a, 251b, 252a, and 252b as the supporting structures, and a supporting groove may be formed between the supporting protrusions 251a, 251b, 252a, and 252b to support the electronic device 110. Referring to FIG. 2B, the side part of the electronic device 110 may be fitted and supported in the supporting groove. Supporting members 253a and 253b may further be provided on the upper surface of the body 210 with the supporting groove-formed portion to support the side surface of the electronic device 110. The supporting members 253a and 253b may be implemented of a high-friction material (e.g., rubber) or a high-elastic material (e.g., sponge). Referring to FIG. 2A, the supporting post 220 may have a supporting plate 254. The supporting plate 254 may include a high-friction material, e.g., rubber. Referring to FIG. 2B, the opposite side portion to the side portion of the electronic device 110 fitted into the supporting groove may be fixed by the supporting plate 254.

Referring to FIG. 2B, the head 240 implemented at the uppermost end of the elevating post 230 may be formed to correspond to various types of characters. A camera 260 may be placed in the head 240 to face downward to be able to capture the document D placed on the ground. The area of the ground capturable by the camera 260 may be defined as an active area A. If the document D is placed on the active area A, the document D may be captured by the camera 260 of the mounting device 130. The elevating post 230 may be implemented to be inserted into a hole of the supporting post 220 and be drawn in or out of the supporting post 220. According, the height of the head 240 of the elevating post 230 from the ground may be adjusted and, as the height is adjusted, the active area A captured by the camera 260 may be adjusted. For example, as the height is changed, the position or area of the active area A captured by the camera 260 may be varied. As an example, if the height is changed, the area of the active area A may be increased.

Referring to FIG. 2A, a connector (or port) may be implemented in a portion of the body 210 of the mounting device 130 to be electrically (and/or operatively) connected with the electronic device 110. By the electrical and/or operative connection, power and/or information may be exchanged (e.g., transmitted and/or received) between the electronic device 110 and the mounting device 130. For example, a connector may be provided in a portion of the body 210 where a through hole 201 is formed. Accordingly, as the connector of the electronic device 110 is connected with the connector implemented in the body 210 of the mounting device 130 through a predetermined interface (e.g., a cable) in a state in which the electronic device 110 is placed on the mounting device 130 by the mounting structure of the mounting device 130, the electronic device 110 and the mounting device 130 may be electrically (and/or operatively) connected with each other. Accordingly, the mounting device 130 may transfer an image including the document D captured by the electronic device 110 through the interface connected to the connector.

According to an embodiment, the server 120 may provide predetermined information to allow the electronic device 110 to provide functions. For example, the electronic device 110 may download a program (or application) for providing functions from the server 120. The program may include modules and a database of the electronic device 110 described below and, as the program runs, the program may control the electronic device 110 to perform predetermined functions.

Without limited to those described, the operations of the electronic device 110 described below may also be performed by the server 120. In other words, the modules and the database of the electronic device 110 may be implemented in the server 120, and the electronic device 110 may be implemented to perform only the operations of transmitting the image including the document D captured by the server 120, receiving content from the server 120 in response to the transmission of the image, and providing the content.

Hereinafter, for convenience of description, in the example described below, the metaverse environment implementation system is implemented so that the electronic device 110 provides functions. However, without limited thereto, at least some of the electronic device 110 described below may be implemented to be performed by the server 120.

2.1. An Example of Configurations of Metaverse Environment Implementation System An example of configurations for performing the operations of the devices included in the metaverse environment implementation system is described below.

Figure 3:
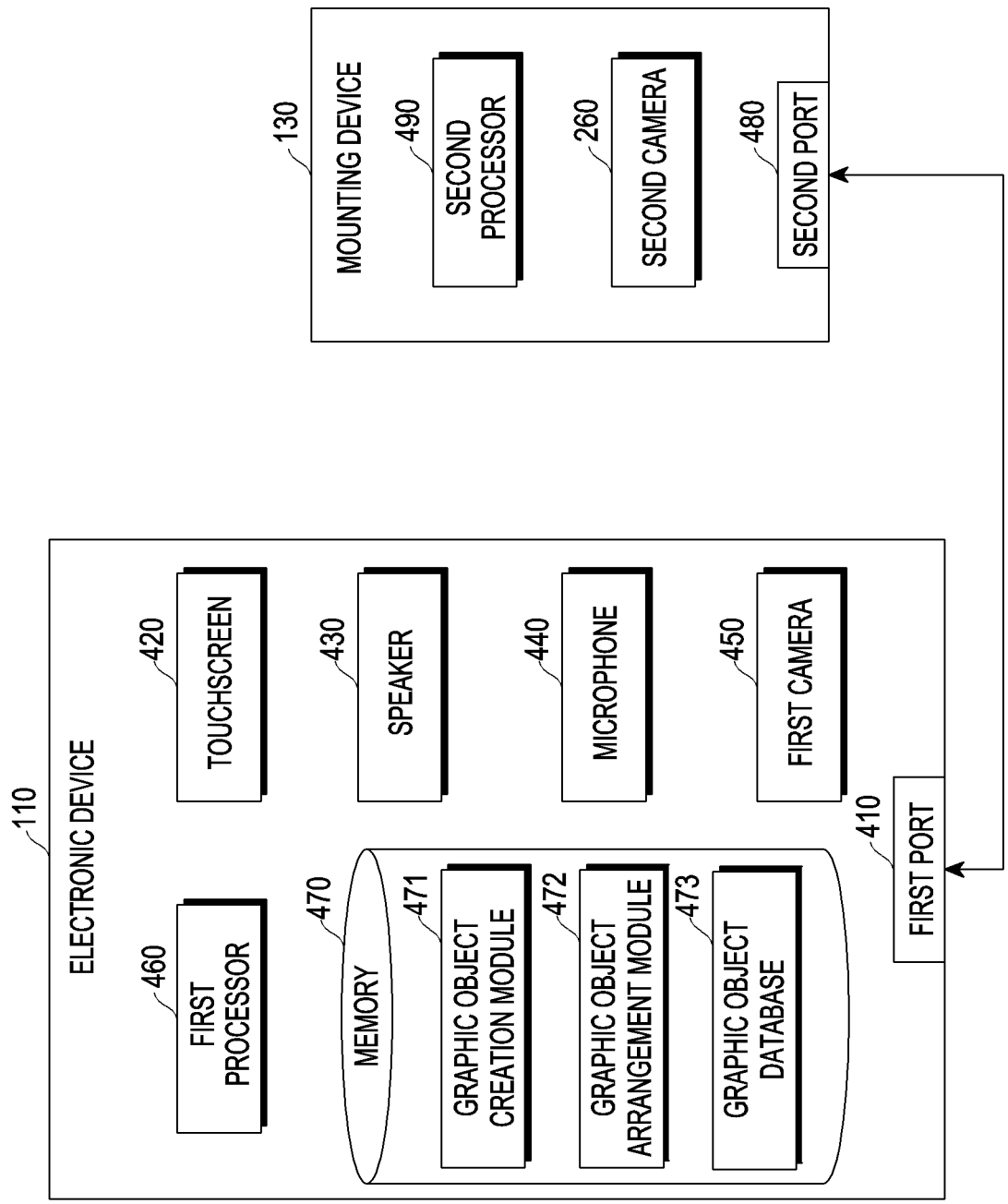
FIG. 3 is a block diagram illustrating an example of a configuration of devices included in a metaverse environment implementation system according to an embodiment.
Figure 4:
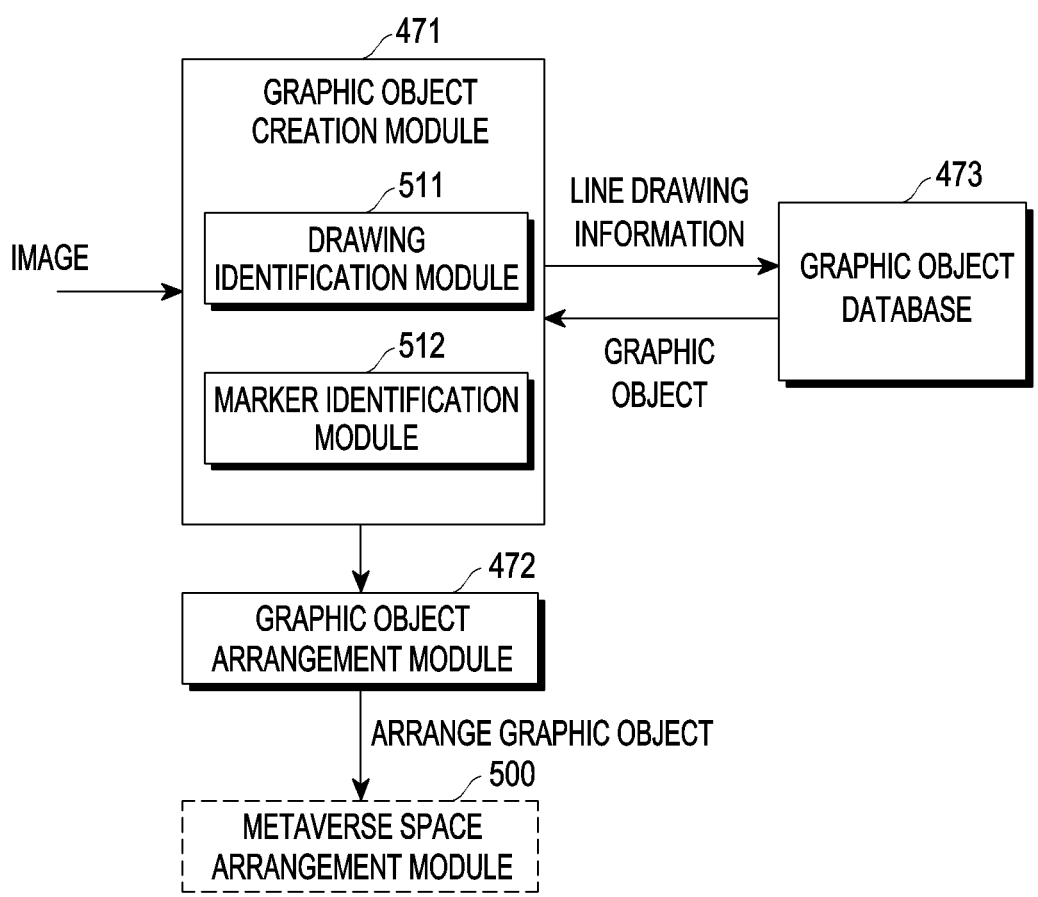
FIG. 4 is a view illustrating an example of an operation of generating and/or placing a graphic object of a metaverse environment implementation system according to an embodiment.
Figure 5:
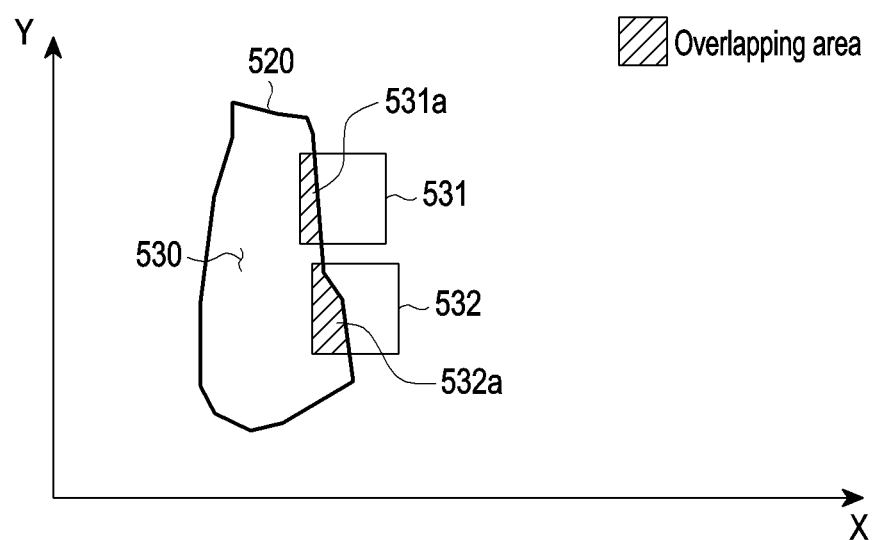
FIG. 5 is a view illustrating an example of an operation of identifying the position of a line drawing and/or a marker according to an embodiment.

FIG. 3 is a block diagram illustrating an example of a configuration of devices (e.g., the electronic device 110 and the mounting device 130) included in a metaverse environment implementation system according to an embodiment. FIG. 4 is a view illustrating an example of an operation of generating and/or placing a graphic object of a metaverse environment implementation system according to an embodiment. FIG. 5 is a view illustrating an example of an operation of identifying the position of a line drawing and/or a marker according to an embodiment.

Hereinafter, an example of the configuration of the electronic device 110 and the mounting device 130 is described with reference to FIGS. 3, 4, and 5.

2.1.1. An Example of the Configuration of the Electronic Device 110

An example of the configuration of the electronic device 110 is described.

Referring to FIG. 3, according to an embodiment, the electronic device 110 may include a first port 410, a touchscreen 420, a speaker 430, a microphone 440, a first camera 450, a first processor 460, and a memory 470 for storing modules (e.g., a graphic object creation module 471, a graphic object arrangement module 472, and a graphic object database 473). Without limited to those shown in FIG. 3, the electronic device 110 may be implemented to include more (e.g., a wireless communication module (not shown) for communicating with the mounting device 130 and the server 120) or less components than those shown.

The first port 410 may be implemented to be electrically and/or operatively connected with the second port 480 of the mounting device 130. For example, the first port 410 may be implemented as a universal serial bus (USB) port but, without limited to those described, the first port 410 may be implemented as various types of ports for connection between devices, e.g., a serial ATA (SATA) port. The first port 410 of the electronic device 110 may be connected to the second port 480 of the mounting device 130 through a predetermined cable. The electronic device 110 may obtain an image including the document D captured by the camera of the mounting device 130 from the mounting device 130 through the first port 410. Alternatively, without limited thereto, a wireless communication module (not shown) may be provided in the electronic device 110, and the electronic device 110 may obtain the image by performing communication with the mounting device 130 by way of the wireless communication module (not shown).

The touchscreen 420 (or display) may be a display device including a layer on which touch sensors are arranged. For example, the touchscreen 420 may display predetermined content. The predetermined content may include at least one of an AR object or an animation screen including at least one graphic object. As another example, the touchscreen 420 may transfer an electrical value generated based on the user's touch on the touch sensor to the first processor 460, and the first processor 460 may sense the user's touch based on the electrical value. A touchscreen driver and a touchscreen driver integrated circuit (IC) for driving the touchscreen 420 may be implemented in the electronic device 110, which belongs to well-known technology and no detailed description thereof is given below.

The microphone 440 may include at least one electromagnetic circuit for obtaining the user's voice. For example, a current may be generated in the electromagnetic circuit by the user's voice input through the microphone 440, and the first processor 460 may obtain an analog signal and/or digital data corresponding to the user's voice based on the value of the generated current.

The first camera 450 may include an image sensor circuit for capture and various circuits (e.g., image processor) for processing captured image data. The image sensor circuit may be implemented in the form of a charge coupled device (CCD) or a complementary metal-oxide semiconductor (CMOS) sensor. As is described below, the document D may be captured by the first camera 450 of the electronic device 110 rather than the camera (e.g., the second camera 260) of the mounting device 130. In this case, a cover member for assisting capture of the first camera 450 may be provided in a portion of the electronic device 110 in which the first camera 450 is positioned. The cover member may include a light diffusion member (e.g., a prism) or a light reflecting member (e.g., a mirror) for assisting capture.

The first processor 460 may control the overall operation of the electronic device 110. To this end, the first control circuit 120 performs calculation and processing on various information and control the operation of the components (e.g., the touchscreen 420, the speaker 430, the microphone 440, and the first camera 450) of the electronic device 110. The first processor 460 may be implemented as a computer or a similar device according to hardware, software, or a combination thereof. When implemented in hardware, the first processor 460 may be provided in the form of an electronic circuit (e.g., a central processing unit (CPU)) that processes electrical signals and performs a control function and, when implemented in software, the first processor 460 may be provided in the form of a program for driving the hardware first processor 460. The modules (e.g., the graphic object creation module 471 and the graphic object arrangement module 472) included in the first processor 460 of the electronic device 110 to be described below may control the first processor 460 to perform operations associated with the modules. In other words, the modules may be implemented as a program, computer readable code, process or instructions for controlling to perform operations associated with the modules and, when the modules are executed by the first processor 460, control the first processor 460 to perform operations associated with the modules. Meanwhile, in the following description, unless otherwise specified, the operation of the electronic device 110 may be interpreted as performed under the control of the first processor 460. Hereinafter, an example of the operation of the first processor 460 by each module is described.

According to an embodiment, the graphic object creation module 471 may be implemented to obtain a graphic object to be placed in the metaverse space. For example, referring to FIG. 4, the graphic object creation module 471 may obtain a specific graphic object corresponding to at least one of the line drawing drawn by the user or a marker placed by the user among a plurality of graphic objects previously stored in the electronic device 110 (e.g., a plurality of graphic objects stored in the graphic object database 473). When obtaining an image, the graphic object creation module 471 may identify the line drawing included in the image using the line drawing identification module 511 and the marker included in the image using the marker identification module 512. The line drawing identification module 511 may perform the operation of extracting the line drawing from the image using an object detection algorithm and/or an artificial intelligence model implemented to identify the line drawing as at least part of the operation of identifying the line drawing. The marker drawing identification module 511 may perform the operation of extracting the line drawing from the image using the object detection algorithm and/or the artificial intelligence model implemented to identify the marker from the image as at least part of the operation of identifying the marker.

According to an embodiment, the graphic object creation module 471 may identify the line drawing and/or marker to be compared with information about the plurality of pre-stored graphic objects (e.g., the plurality of graphic objects stored in the graphic object database 473) from the image, based on the position of the line drawing and position of the marker identified from the image. For example, referring to FIG. 5, the graphic object creation module 471 may select the line drawing and marker determined to meet a designated condition, as information for identifying the graphic object, based on comparison of the position of the marker placed and the area defined by the line drawing extracted from the image. For example, the designated condition may be set to be met when the overlapping area between the area defined by the line drawing and the marker is a designated area or more. As an example, referring to FIG. 5, the graphic object creation module 471 may identify the line drawing 520 and marker 532 for selecting a graphic object, among the plurality of markers (e.g., the first marker 531 and the second marker 532) and the area 530 defined by the line drawing 520 identified from the image. The graphic object creation module 471 may identify that the designated condition is not met based on identifying that the overlapping area 531a of the area 530 defined by the line drawing 520 and the first marker 531 is less than the designated area and may identify that the first marker 531 and the line drawing 520 meet the designated condition when the overlapping area 532a of the area 530 defined by the line drawing 520 and the second marker 532 is the designated area or more. However, without limited to those described and/or shown, the designated condition may be set to be met when the line drawing and the marker overlap.

According to an embodiment, the graphic object creation module 471 may identify a specific graphic object corresponding to at least one of information about the marker identified or information about the line drawing identified from the pre-stored graphic object database 473.

For example, the graphic object database 473 may previously store information about the plurality of graphic objects and at least one of the line drawings or markers associated with the plurality of graphic objects as shown in Table 1 below. Accordingly, the graphic object creation module 471 may identify the specific graphic object corresponding to the line drawing or marker identified from the graphic object database 473.

TABLE 1

| graphic object | line drawing or marker |
| --- | --- |
| refrigerator object | rectangle or object marker representing refrigerator |
| closet object | rectangle or object marker representing rectangle |
| light object | triangle or object marker representing light |

As an example, the graphic object database 473 may previously store information about markers to be compared with the marker placed by the user and line drawings to be compared with the line drawing drawn by the user, associated with the plurality of graphic objects, along with the plurality of graphic objects as shown in Table 2 below. Accordingly, the graphic object creation module 471 may identify the specific graphic object corresponding to the line drawing and marker meeting the designated condition (e.g., overlapping in a designated area or more) from the graphic object database 473.

TABLE 2

| | line drawing | | | |
| --- | --- | --- | --- | --- |
| graphic object | level 1 | level 2 | level 3 | marker |
| refrigerator object | first line drawing | second line drawing | third line drawing | food marker |
| closet object | fourth line drawing | fifth line drawing | sixth line drawing | clothes marker |
| microwave oven object | first line drawing | seventh line drawing | eighth line drawing | food marker |

As an example, referring to FIG. 4 and Table 1, upon identifying the line drawing representing a rectangular along with the food marker, the graphic object creation module 471 may identify the refrigerator object from the graphic object database 473.

In this case, the graphic object database 473 may previously store line drawings for the plurality of levels (e.g., the first level, the second level, and the third level) associated with the specific graphic object. The level may indicate the degree of specification of the line drawing, and as the level of the line drawing increases, the line drawing may be more specific. As an example, referring to FIG. 4 and Table 1, when a line drawing representing a rectangle is drawn and a food marker is placed by the graphic object creation module 471, the refrigerator object and the microwave oven object may be identified from the graphic object database 473. The graphic object creation module 471 may request a more specific line drawing from the user to identify the specific graphic object among the plurality of graphic objects (e.g., refrigerator object and microwave oven object) and, if a more specific line drawing is drawn accordingly, the graphic object creation module 471 may identify the specific graphic object (e.g., microwave oven object) from the plurality of graphic objects (e.g., refrigerator object and microwave oven object) based on identifying the line drawing.

According to an embodiment, upon identifying a color marker from the image, the graphic object creation module 471 may set an attribute (e.g., color) of the graphic object based on the color of the color marker, which is described below in further detail.

According to an embodiment, the graphic object arrangement module 472 may place the graphic object obtained by the graphic object creation module 471 in the area of the metaverse space corresponding to the position of at least one of the identified line drawing or marker. The metaverse space may include at least one area where the graphic object may be placed. The metaverse space is graphic content that may be displayed (or provided, or output) by an electronic device and may include a three-dimensional (3D) graphic space and an extended reality (XR) space (e.g., virtual reality (VR), augmented reality (AR), and mixed reality (MR)).

According to an embodiment, the memory 470 may store various pieces of information (e.g., the above-described modules 471 and 472 and the graphic object database 473). The memory may temporarily or semi-permanently store data. As another example, the memory of the electronic device 110 may store an operating system (OS) for driving the electronic device 110 and data for hosting the website or data regarding programs or applications (e.g., web applications). Examples of the memory may include a hard disk (HDD), a solid state drive (SSD), a flash memory, a read-only memory (ROM), a random access memory (RAM), and the like. Such a database may be provided in a built-in type or a detachable type.

2.1.2. An Example of the Configuration of the Mounting Device 130

An example of the configuration of the mounting device 130 is described below.

Referring to FIG. 3, according to an embodiment, the mounting device 130 may include a second port 480, a second camera 260, and a second processor 490. Without limited to those shown in FIG. 4, the mounting device 130 may be implemented to include more (e.g., a wireless communication module (not shown) for communicating with the electronic device 110 and the server 120) or less components than those shown.

The second port 480 may be implemented to be electrically and/or operatively connected with the first port 410 of the electronic device 110. For example, the second port 480 may be implemented as a universal serial bus (USB) port but, without limited to those described, the first port 410 may be implemented as various types of ports for connection between devices, e.g., a serial ATA (SATA) port. The second port 480 of the mounting device 130 may be connected to the first port 410 of the electronic device 110 through a predetermined cable. The mounting device 130 may obtain an image including the document D captured by the second camera 260 of the mounting device 130, with the electronic device 110.

The second camera 260 may capture the document D. For example, as described in connection with FIG. 2B, the second camera 260 may be provided in the head 240 and may capture the document D placed on the ground. The second camera 260 may include an image sensor circuit for capture and various circuits (e.g., image processor) for processing captured image data. The image sensor circuit may be implemented in the form of a CCD or CMOS sensor.

The second processor 490 may control the overall operation of the mounting device 130. To this end, the second processor 490 may perform calculation and processing on various information and control the operation of the components (e.g., the second camera 260) of the mounting device 130.

2.2. An Example of Implementation of Metaverse Environment Implementation System The metaverse environment implementation system may be implemented in a system type or an on-device type as described above.

According to an embodiment, as described above, when implemented to perform the operation (e.g., capturing operation) of capturing an image including the document D by the mounting device 130 while performing the operation (e.g., the operation of providing content) of providing content based on analysis of the image captured by the electronic device 110, the metaverse environment implementation system may be defined as the system type.

However, without limited to those described, the metaverse environment implementation system implemented in the system type may be implemented so that the mounting device 130 performs the operation (e.g., capturing operation) for capturing the image including the document D, and the server 120 receives the image through the electronic device 110 and performs the operation (e.g., content providing operation) of providing content based on analysis of the image captured by the electronic device 110.

According to an embodiment, when the above-described operations (e.g., capturing operation and content providing operation) are implemented to be performed by one device, the metaverse environment implementation system may be defined as the on-device type. For example, the electronic device 110, instead of the mounting device 130, may be implemented to obtain the image including the document D on its own by performing capture using the camera and perform the operation of providing content based on analysis of the image.

Although the metaverse environment implementation system described below is implemented as the system type for convenience of description, the metaverse environment implementation system may also be implemented as the on-device type without limited thereto. For example, the operation in which the mounting device 130 obtains the image as described below may also be appreciated as the operation in which the electronic device 110 obtains the image.

3. Operation of Metaverse Environment Implementation System

Various examples of the operation of the devices (e.g., the mounting device 130 and the electronic device 110) constituting the metaverse environment implementation system are described below.

3.1. First Embodiment <Providing a Metaverse Space and Arranging Graphic Objects>

According to an embodiment, the electronic device 110 may display a metaverse space on the display (e.g., the touchscreen 420) and may place the graphic object obtained based on at least one of the line drawing drawn by the user or the marker placed by the user, on the metaverse space.

Figure 6:
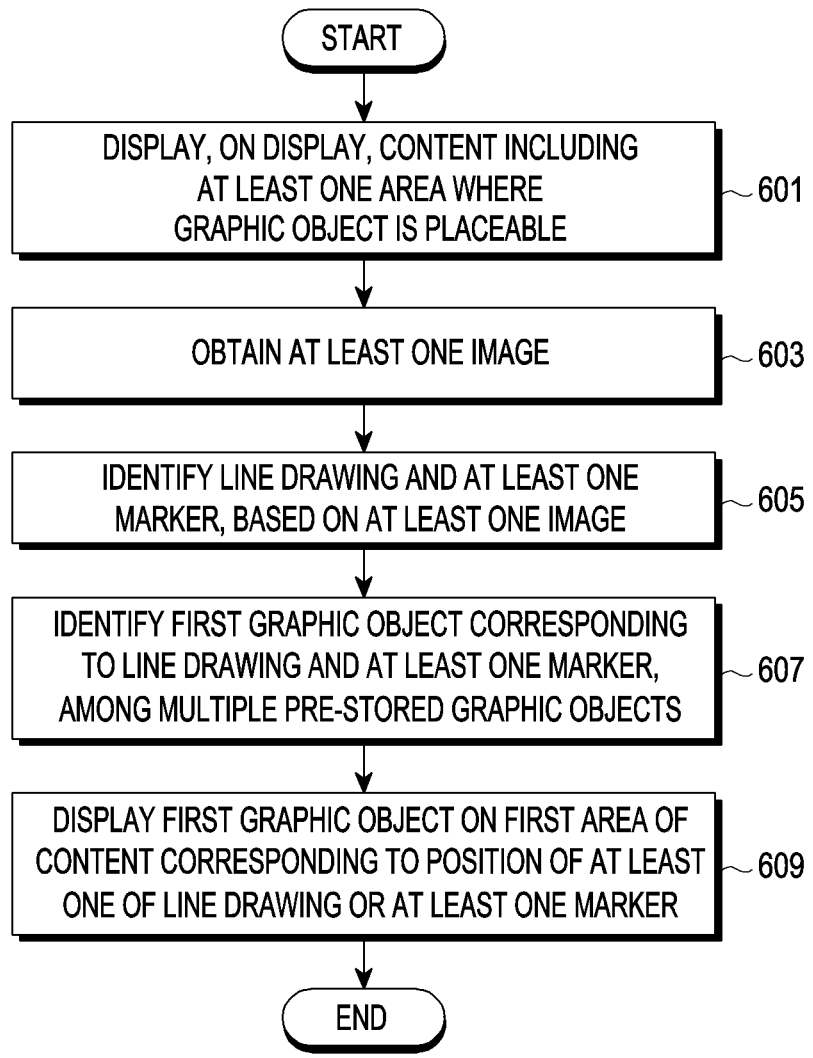
FIG. 6 is a flowchart illustrating an example of an operation of a metaverse environment implementation system according to an embodiment.

FIG. 6 is a flowchart illustrating an example of an operation of a metaverse environment implementation system according to an embodiment. According to an embodiment, operations of the metaverse environment implementation system are not limited in order to the operations shown in FIG. 6 and may be performed in a different order than that shown. According to an embodiment, not only the operations of the metaverse environment implementation system shown in FIG. 6 but also additional operations may be performed, or at least one operation except for some of the operations may be performed. FIG. 6 is described below with reference to FIGS. 7A, 7B, 7C, and 8.

Figure 7A:
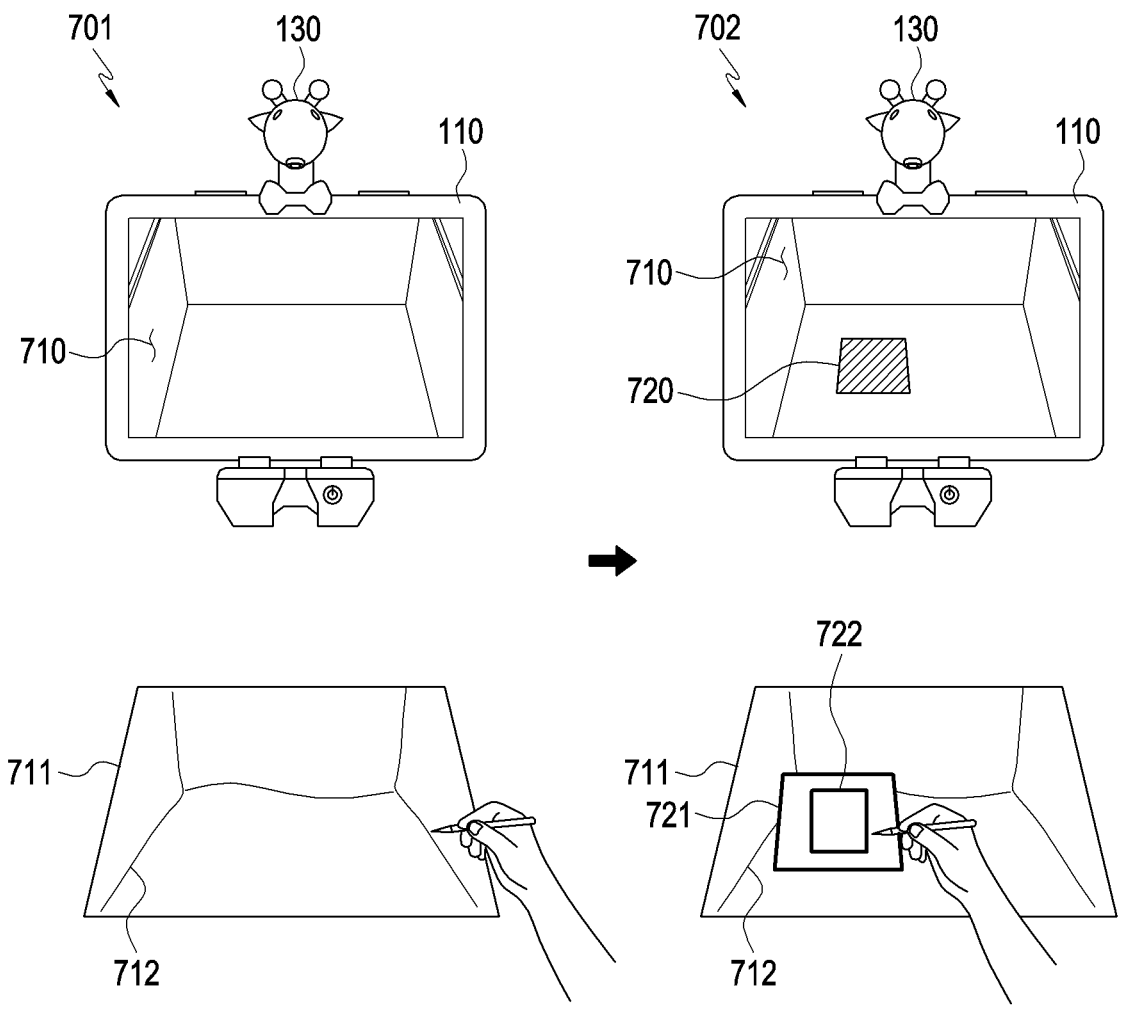
FIG. 7A is a view illustrating an example of an operation of providing a metaverse space and identifying an area in which a graphic object is to be displayed by an electronic device according to an embodiment.
Figure 7B:
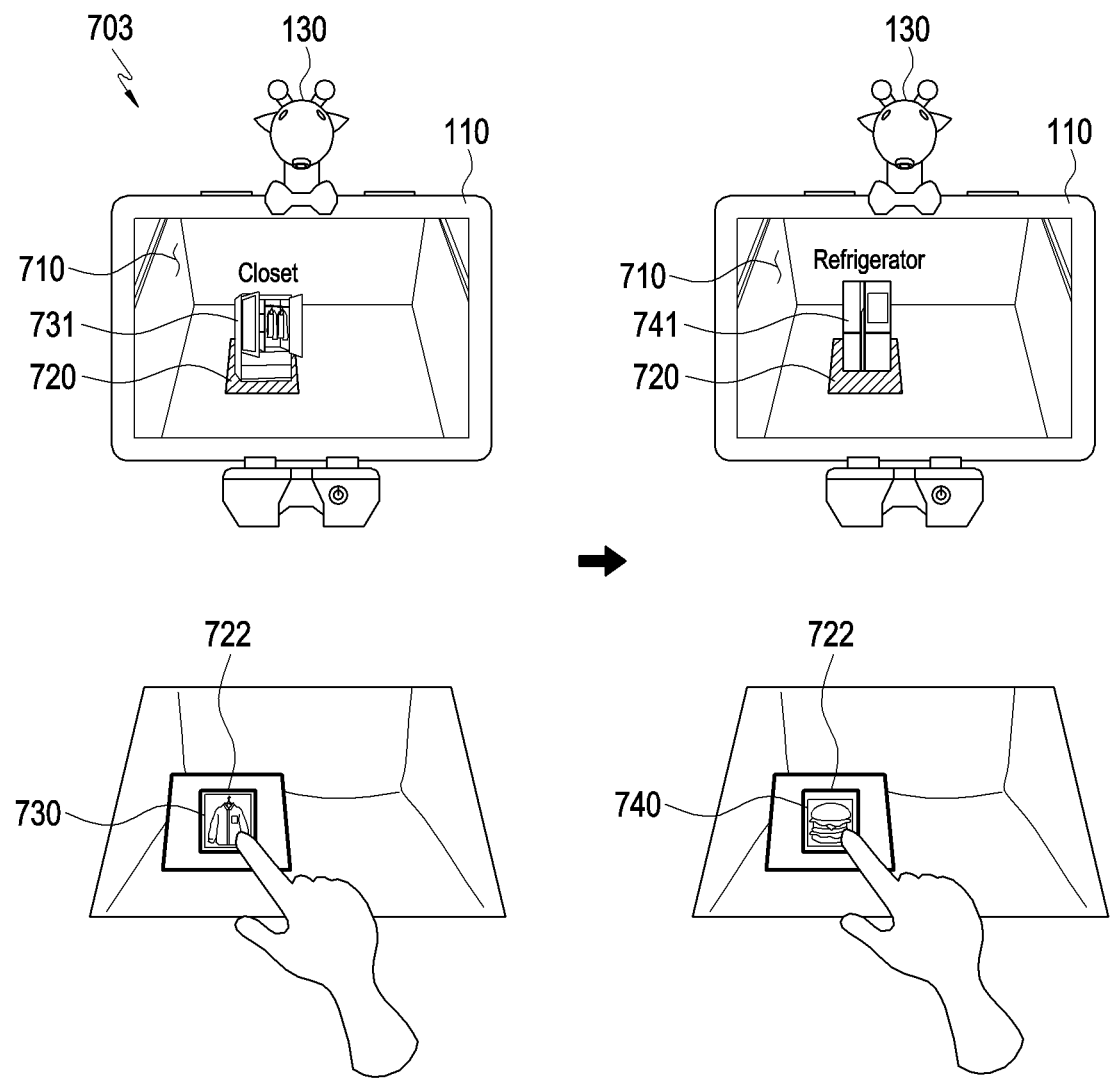
FIG. 7B is a view illustrating an example of an operation of placing a graphic object on a metaverse space by an electronic device according to an embodiment.
Figure 7C:
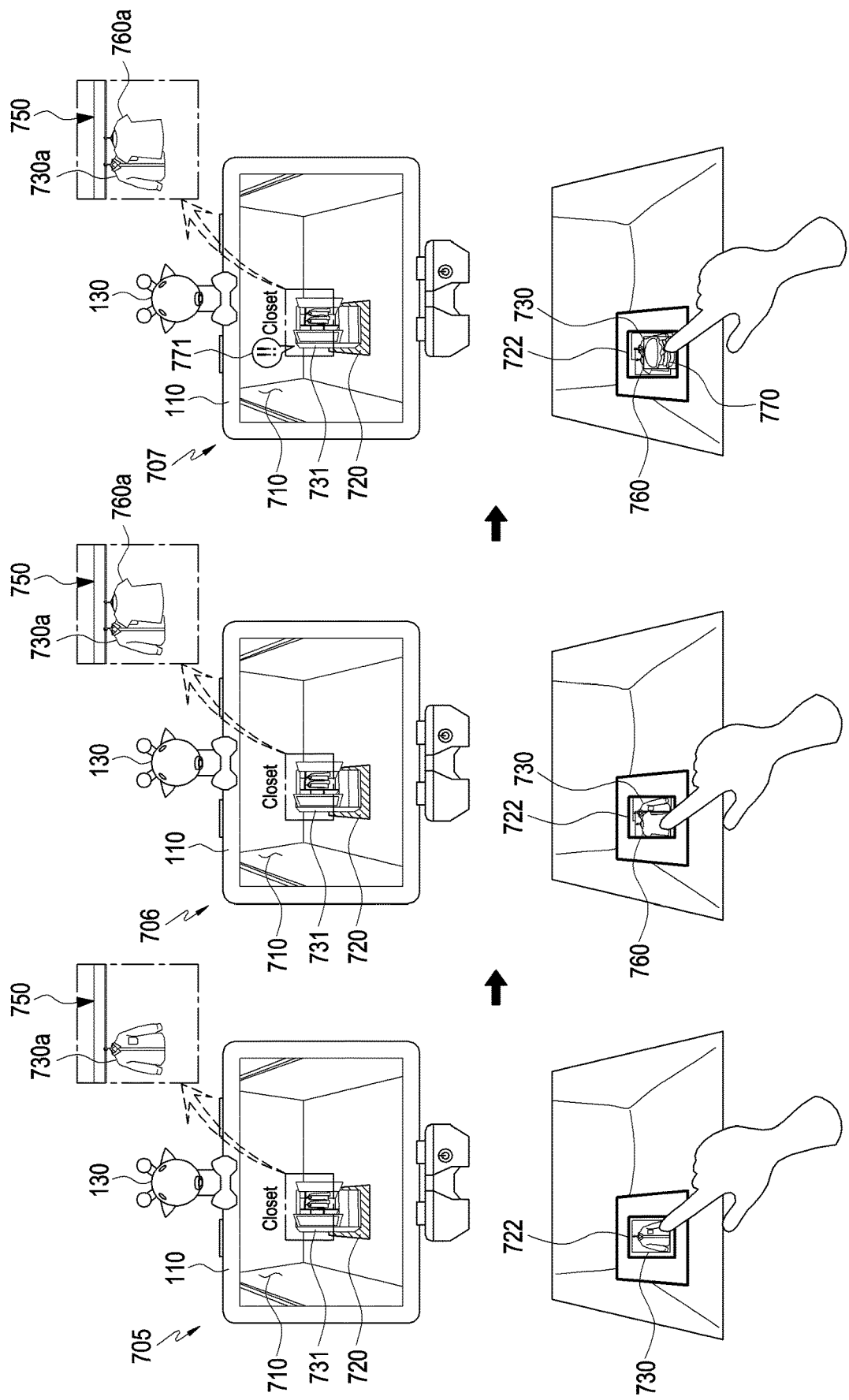
FIG. 7C is a view illustrating an example of an operation of changing a graphic object according to an arrangement of markers according to an embodiment.
Figure 8:
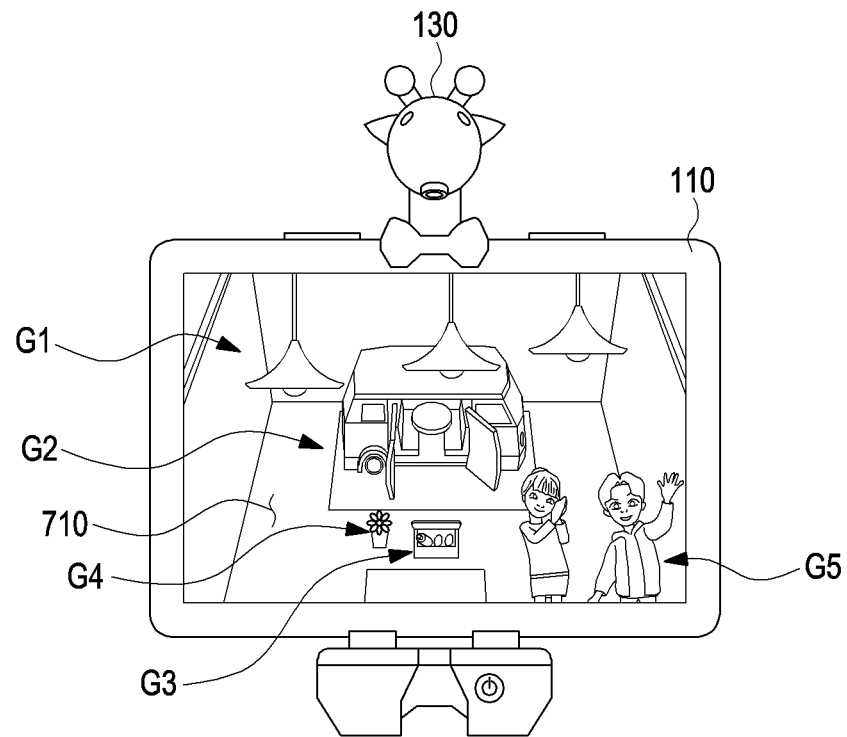
FIG. 8 is a view illustrating an example of a metaverse space where various types of graphic objects are arranged according to an embodiment.
Figure 8:
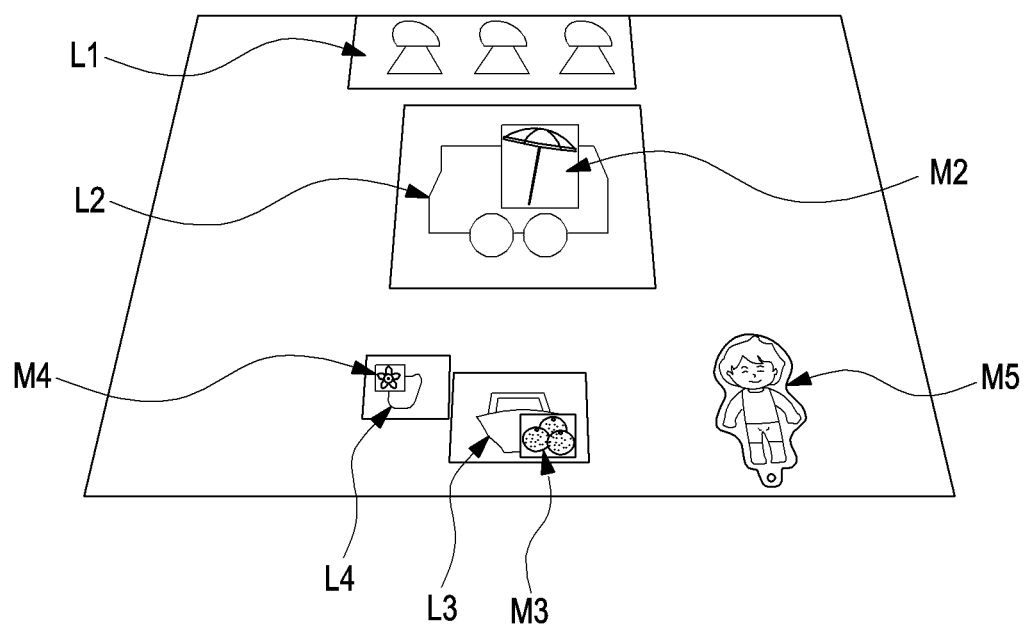

FIG. 7A is a view illustrating an example of an operation of providing a metaverse space and identifying an area in which a graphic object is to be displayed by an electronic device 110 according to an embodiment. FIG. 7B is a view illustrating an example of an operation of placing a graphic object in a metaverse space by an electronic device 110 according to an embodiment. FIG. 7C is a view illustrating an example of an operation of changing a graphic object according to an arrangement of markers according to an embodiment. FIG. 8 is a view illustrating an example of a metaverse space where various types of graphic objects are arranged according to an embodiment.

According to an embodiment, in operation 601, the electronic device 110 may display content including at least one area where the graphic object may be placed, on the display. For example, as shown in 701 of FIG. 7A, the electronic device 110 may display, on the display, content 710 corresponding to the metaverse space. As an example, as shown in 701 of FIG. 7A, a line drawing 712 may be drawn to generate the metaverse space on the document 711 by the user. The electronic device 110 may identify the line drawing 712 included in the image received through the mounting device 130 and drawn on the document 711 and may display the content 710 corresponding to the identified line drawing 712 among a plurality of contents associated with the metaverse space pre-stored in the electronic device 110. As an example, based on a line drawing representing a room being drawn by the user, the electronic device 110 may display content for the metaverse space representing the inside of the room corresponding to the drawn line drawing. However, without limited to those described and/or shown, rather than the line drawing 712 being drawn on the document 711 by the user, a pre-drawn line drawing and/or code (e.g., QR code) may be included in the document 711. Accordingly, the electronic device 110 may display, on the display, the content for the metaverse space corresponding to the identified pre-drawn line drawing, and/or code (e.g., QR code). However, without limited to those described, the line drawing may be drawn on the ground, rather than on the document 711.

According to an embodiment, in operation 603, the electronic device 110 may obtain at least one image and, in operation 605, identify at least one marker and line drawing based on the at least one image. For example, referring to FIGS. 7A and 7B, while the content corresponding to the metaverse space is displayed on the display of the electronic device 110, the user may draw the line drawing 722 and place markers 730 and 740. The electronic device 110 (e.g., the graphic object creation module 471) may receive at least one image captured by the mounting device 130 and identify the drawn line drawing 722 and markers 730 and 740 from the at least one received image. In this case, as shown in FIG. 7A, the user may draw the line drawing 722 on a separate document 721 from the document 711 where the line drawing representing the metaverse space is drawn. The electronic device 110 (e.g., the graphic object creation module 471) may distinguish between the document 711 and the document 721 from the image received from the mounting device 130 and identify that the line drawing 722 drawn on the other document 721 than the document 711 where the line drawing for representing the metaverse space is drawn, as the line drawing for generating a graphic object. Alternatively, the electronic device 110 (e.g., the graphic object creation module 471) may identify that the line drawing 722 other than the line drawing 712 identified before among the plurality of line drawings 712 and 722 identified from the image received from the mounting device 130 is the line drawing for generating the graphic object. However, without limited to those described and/or shown, the line drawing 722 may be drawn on the document 711 where the line drawing for representing the metaverse space is drawn.

According to an embodiment, the electronic device 110 (e.g., the graphic object creation module 471) may sequentially perform the operation of identifying the line drawing and the operation of identifying the marker. For example, after drawing the line drawing 722 as shown in 702 of FIG. 7A, the electronic device 110 may place markers 730 and 740 on the line drawing 722 as shown in 703 and 704 of FIG. 7B. Accordingly, the electronic device 110 (e.g., the graphic object creation module 471) may identify the line drawing 722 based on a first image received from the mounting device 130 and then identify the markers 730 and 740 based on a second image received from the mounting device 130. As the operation of identifying the line drawing and the operation of identifying the marker are sequentially performed, although the line drawing 722 is hidden by the markers 730 and 740, the line drawing 722 may be identified by the electronic device 110 (e.g., the graphic object creation module 471).

According to an embodiment, the electronic device 110 (e.g., the graphic object creation module 471) may identify the line drawing 722 and the markers 730 and 740 meeting a designated condition (e.g., requiring that the overlapping area is a designated area or more) for generation of the graphic object.

According to an embodiment, in operation 607, the electronic device 110 may identify a first graphic object corresponding to at least one marker and the line drawing among a plurality of pre-stored graphic objects. For example, as described in connection with Tables 1 and 2, the electronic device 110 (e.g., the graphic object creation module 471) may identify graphic objects (e.g., the closet object 731 and the refrigerator object 741) based on comparison between information about the graphic objects included in the graphic object database 473 and the identified line drawing 722 and the markers 730 and 740. As an example, referring to 703 of FIG. 7B, the electronic device 110 (e.g., the graphic object creation module 471) may identify the closet object 731 associated with the line drawing 722 representing the rectangle and the marker 730 representing the clothes placed to at least partially overlap the line drawing 722, from the graphic object database 473. As an example, referring to 704 of FIG. 7B, the electronic device 110 (e.g., the graphic object creation module 471) may identify the refrigerator object 741 associated with the line drawing 722 representing the rectangle and the marker 740 representing the food placed to at least partially overlap the line drawing 722, from the graphic object database 473.

According to an embodiment, in operation 609, the electronic device 110 may display the first graphic object on the first area of the content corresponding to the position of at least one of the line drawing or at least one marker. For example, the electronic device 110 (e.g., the graphic object creation module 471) may determine the area 720 of the content corresponding to the position where the line drawing 722 is drawn as shown in 702 of FIG. 7A and display the graphic objects 731 and 741 on the determined area 720 as shown in 703 and 704 of FIG. 7B. For example, the electronic device 110 (e.g., the graphic object creation module 471) may map the area of the document 711 where the line drawing 712 representing the metaverse space is drawn to the area of the content for the metaverse space. The electronic device 110 may identify the area 720 of the content for the metaverse space corresponding to the position of the line drawing 722 on the document 711 identified from the image based on the mapping and display the graphic objects 730 and 740 on the identified area 720.

According to an embodiment, the graphic object may be implemented to provide a predetermined function associated with the type of the graphic object. For example, referring to FIG. 7C, when the graphic object is the closet object 731, the graphic object may provide the function of storing clothes. For example, referring to 705 and 706 of FIG. 7C, a portion 750 (e.g., a portion representing the clothes storing space) of the closet object 731 may provide the function of storing clothes. As the user sequentially places the markers 730 and 760 representing clothes, on the line drawing 722 for implementing the closet object 731, the electronic device 110 (e.g., the graphic object creation module 471) may store the clothes objects 730a and 760a corresponding to the markers 730 and 760 in the portion 750, and the stored clothes objects 730a and 760a may be displayed on the portion 750 of the closet object. Accordingly, the user may have such an experience as if she stores clothes in the closet in the real world by storing clothes in the virtual closet object 731 implemented in the metaverse space. Upon identifying a marker different in type from the implemented object, the electronic device 110 may provide a notification therefor. As an example, referring to 707 of FIG. 7C, when the marker 770 representing food is placed on the line drawing 722 for implementing the closet object 731, the electronic device 110 (e.g., the graphic object creation module 471) may display a warning 711 indicating that a marker of a type not corresponding to the closet object 731 is placed.

As a result, as shown in FIG. 8, the electronic device 110 (e.g., the graphic object creation module 471) may display, on the content 710 corresponding to the metaverse space, the light object G1 corresponding to the line drawing L1 representing the light, the camping car object G2 associated with the marker M2 representing the parasol and the line drawing L2 representing the car, the basket object G3 containing fruits associated with the marker M3 representing fruits and the line drawing L3 representing the basket, the flowerpot object G4 with flowers associated with the marker M4 representing flowers and the line drawing L4 representing the flowerpot, and the virtual avatar G5 corresponding to the character marker M5.

3.2. Second Embodiment <Operation of Guiding Line Drawing and Obtaining Graphic Object According to Line Drawing>

The above-described operations of the metaverse environment implementation system may be applied to the second embodiment and no detailed description thereof is thus given.

According to an embodiment, the electronic device 110 may determine whether a line drawing drawn by the user meets a designated condition for identifying the graphic object and, when the designated condition is not met, guide the line drawing. The user may add a drawing to the line drawing to make the graphic object identifiable according to the guide. When the line drawing meeting the designated condition is identified, the electronic device 110 may perform the operation of comparing the identified line drawing with the line drawing associated with the graphic object stored in the graphic object database 473 and select a specific graphic object according to the similarity.

Figure 9:
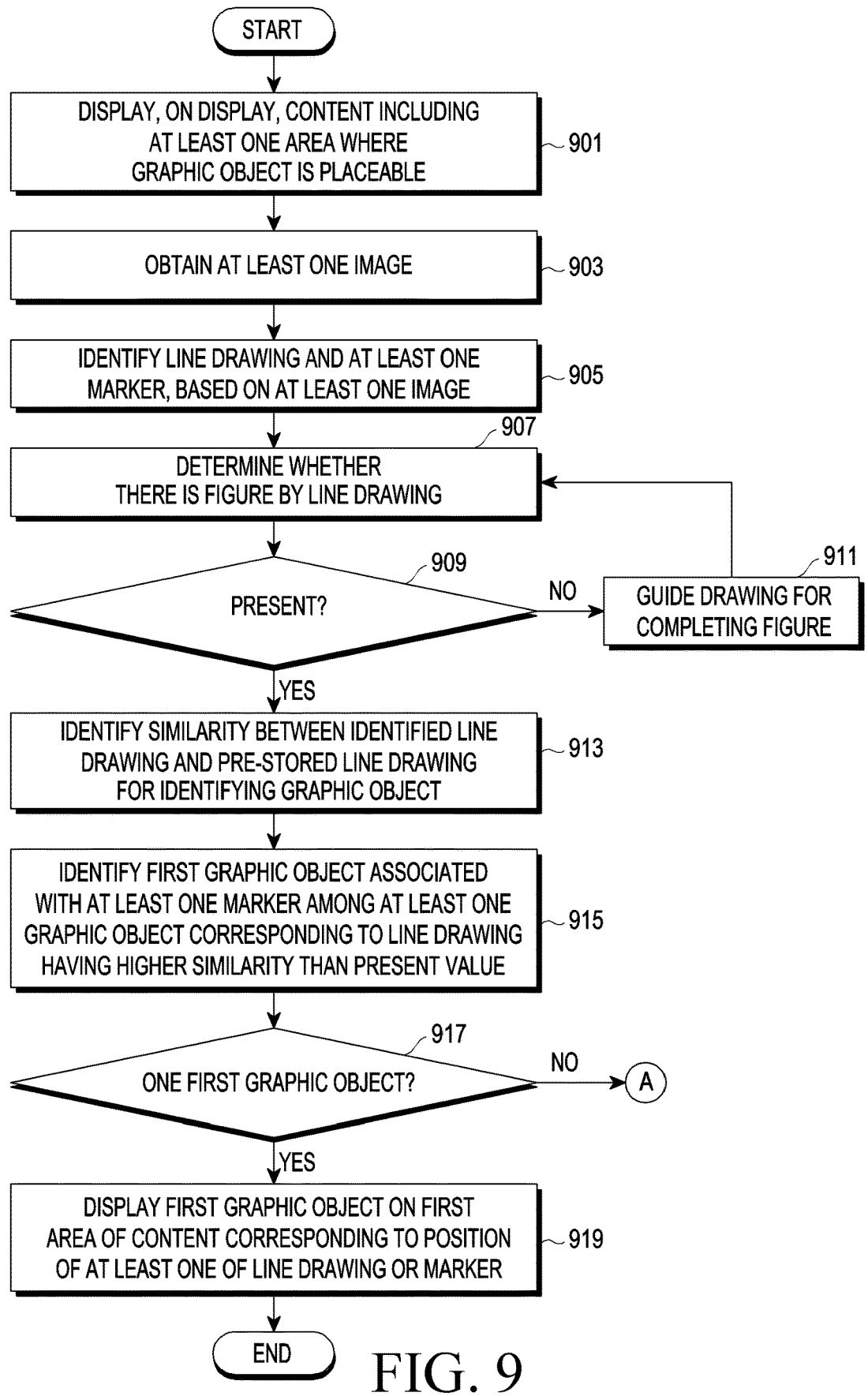
FIG. 9 is a flowchart illustrating another example of an operation of a metaverse environment implementation system according to an embodiment.

FIG. 9 is a flowchart illustrating another example of an operation of a metaverse environment implementation system according to an embodiment.

According to an embodiment, operations of the metaverse environment implementation system are not limited in order to the operations shown in FIG. 9 and may be performed in a different order than that shown. According to an embodiment, not only the operations of the metaverse environment implementation system shown in FIG. 8 but also additional operations may be performed, or at least one operation except for some of the operations may be performed. FIG. 9 is described below with reference to FIGS. 10 and 11.

Figure 10:
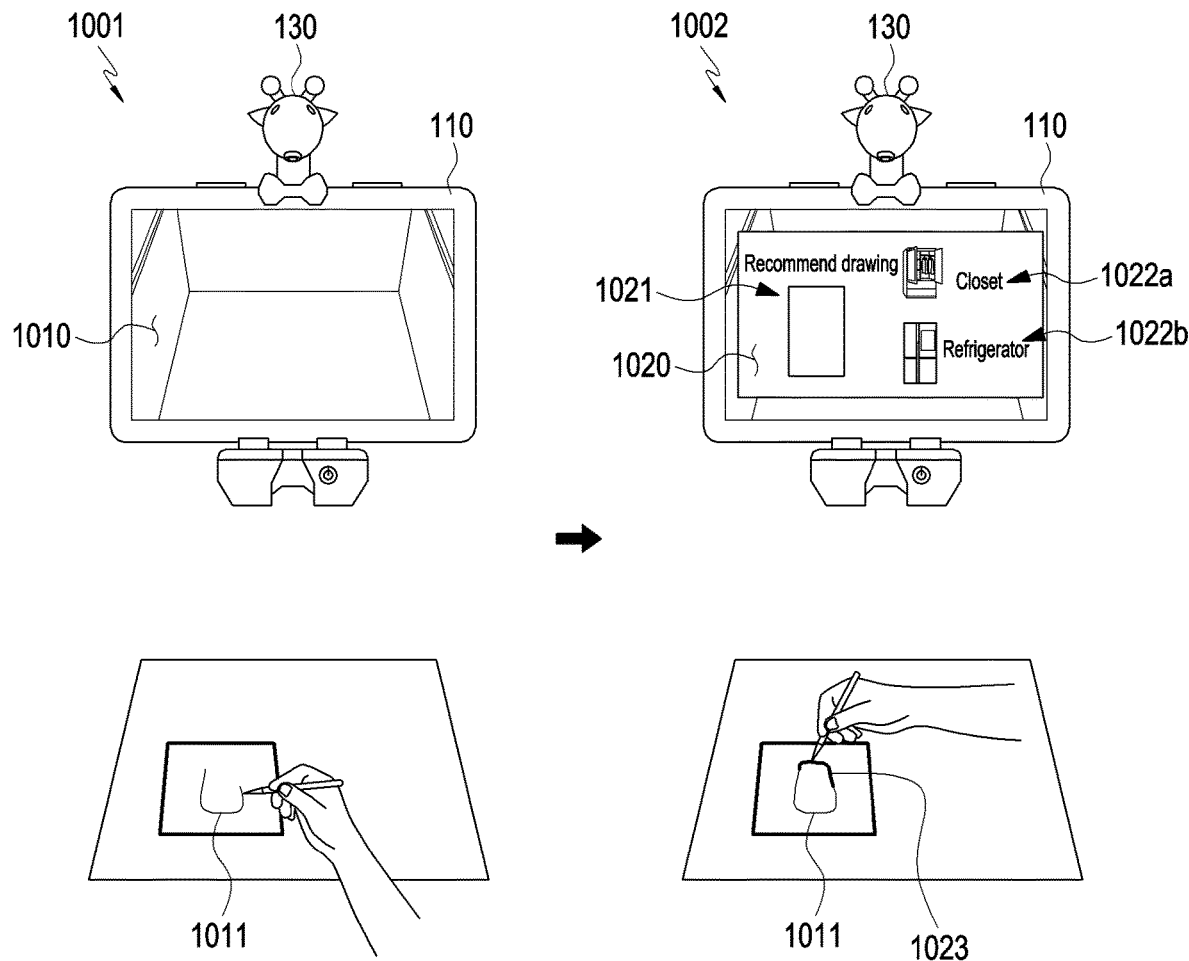
FIG. 10 is a view illustrating an example of an operation of guiding a line drawing by an electronic device according to an embodiment.
Figure 11:
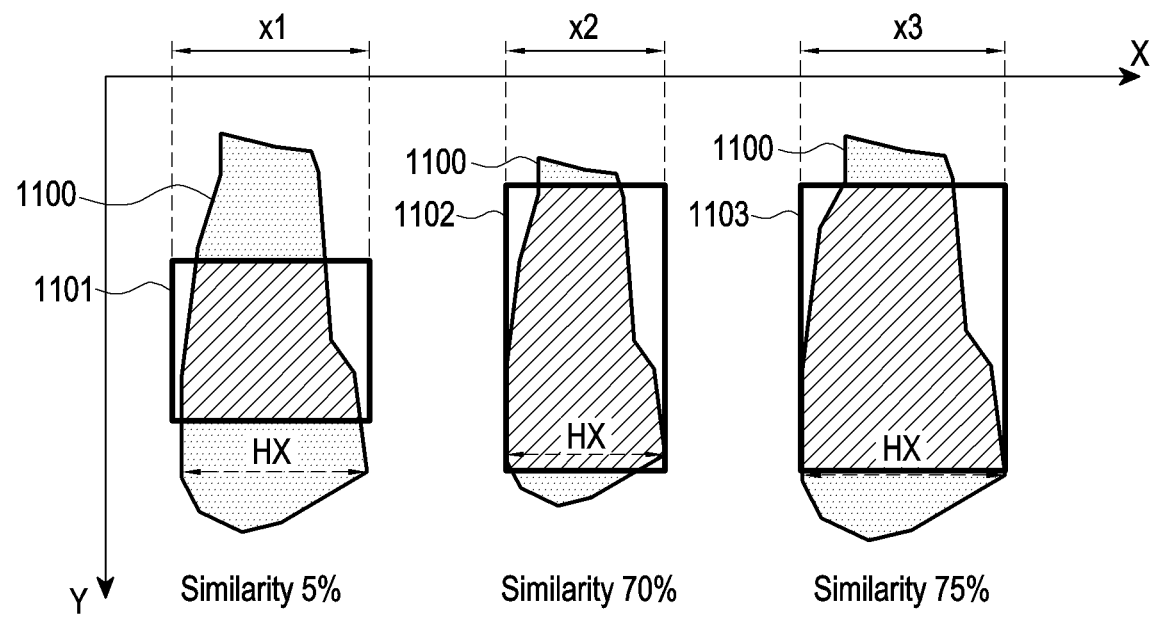
FIG. 11 is a view illustrating an example of an operation of comparing a line drawing and a pre-stored line drawing for identifying a graphic object by an electronic device according to an embodiment.

FIG. 10 is a view illustrating an example of an operation of guiding a line drawing by an electronic device 110 according to an embodiment. FIG. 11 is a view illustrating an example of an operation of comparing a line drawing and a pre-stored line drawing for identifying a graphic object by an electronic device 110 according to an embodiment.

According to an embodiment, in operation 901, the electronic device 110 may display content including at least one area where the graphic object may be placed, on the display. For example, as shown in 1001 of FIG. 10, the electronic device 110 may display content 1010 for the metaverse space, including at least one area where the graphic object may be placed. Operation 901 of the electronic device 110 may be performed like operation 601 of the electronic device 110 as described above, and no duplicate description thereof is given below.

According to an embodiment, in operation 903, the electronic device 110 may obtain at least one image and, in operation 905, identify at least one marker and line drawing based on the at least one image. For example, as shown in 1001 of FIG. 10, while the content 1010 for the metaverse space is displayed on the electronic device 110, the user may draw a line drawing 1011. The electronic device 110 may identify the line drawing 1011 drawn by the user from the image received from the mounting device 130.

According to an embodiment, in operation 907, the electronic device 110 may determine whether there is a figure by the line drawing and, when it is determined in operation 909 that there is no figure by the line drawing (No in 909), guide the drawing for completing the figure in operation 911. For example, the electronic device 110 may identify the time during which the line drawing 1011 is not further drawn, based on identifying the line drawing 1011 from the image received from the mounting device 130 and, when the identified time exceeds a designated time, determine whether there is a figure by the drawn line drawing 1011. For example, as at least part of determining whether a figure is identified, the electronic device 110 (e.g., the graphic object creation module 471) may determine whether one end and another end of the line drawing 1011 are connected and/or whether the distance between the one end and the other end is within a preset distance. In other words, as at least part of determining whether a figure is identified, the electronic device 110 (e.g., the graphic object creation module 471) may determine whether there is a closed area defined by the line drawing 1011. When it is determined that no figure is identified, the electronic device 110 (e.g., the graphic object creation module 471) may display, on the display, a screen 1020 for guiding the user to further draw to complete the figure as shown in 1002 of FIG. 10. The electronic device 110 (e.g., the graphic object creation module 471) may identify a figure (e.g., a rectangle) similar to the drawn line drawing 1011 among pre-stored figures and may display, on the display, a screen 1020 including information 1021 about the identified figure (e.g., a rectangle) and information (e.g., the closet object 1022a and the refrigerator object 1022b) about the graphic object associated with the corresponding figure. The user may identify the figure (e.g., the rectangle 1021) recommended from the screen 1020 displayed on the display and further draw the line drawing 1023. Resultantly, the electronic device 110 may identify the figure defined by the line drawings 1011 and 1023 based on providing the screen 1020.

According to an embodiment, when it is determined in operation 909 that there is a figure by the line drawing (Yes in 909), the electronic device 110 may identify the similarity between the identified line drawing and the line drawing (e.g., figure) for identifying the pre-stored graphic object in operation 913, and identify the first graphic object associated with at least one marker among at least one graphic object corresponding to the line drawing higher in similarity than a preset value in operation 915. For example, as shown in FIG. 11, the electronic device 110 (e.g., the graphic object creation module 471) may compare the line drawings 1100 (e.g., the line drawings 1011 and 1023) drawn by the user with the plurality of line drawings 1101, 1102, and 1103 included in the graphic object database 473 and, based on the result of comparison, determine similarities between the line drawings 1100 (e.g., the line drawings 1011 and 1023) and the plurality of line drawings 1101, 1102, and 1103. The plurality of line drawings 1101, 1102, and 1103 may respectively correspond to different types of graphic objects. As at least part of determining the similarity, the electronic device 110 (e.g., the graphic object creation module 471) may align (e.g., center-align) the line drawings 1100 with the plurality of line drawings 1101, 1102, and 1103 and, in the aligned state, identify the overlapping areas and non-overlapping areas between the line drawings 1100 and the plurality of line drawings 1101, 1102, and 1103, and identify the similarities based on the result of subtracting the identified non-overlapping areas from the identified overlapping areas. For example, the similarity may be proportional to the result of the subtraction. The electronic device 110 (e.g., the graphic object creation module 471) may determine that the line drawings 1102 and 1103 whose similarity to the line drawing 1101 drawn by the user is the preset value or more are line drawings intended by the user. As a result, the electronic device 110 (e.g., the graphic object creation module 471) may identify the graphic object corresponding to the placed marker among the graphic objects (e.g., the refrigerator object and closet object) corresponding to the line drawings 1102 and 1103 whose similarity is identified to be higher than the preset value.

According to an embodiment, the electronic device 110 (e.g., the graphic object creation module 471) may transform (or resize) the line drawing 1100 for comparison with the plurality of pre-stored line drawings 1101, 1102, and 1103. For example, as shown in FIG. 11, the electronic device 110 (e.g., the graphic object creation module 471) may resize the line drawing 1100 to allow the longest width HX in the x-axis direction of the line drawing 1100 drawn by the user to correspond to the widths x1, x2, and x3 in the x-axis direction of the pre-stored specific line drawings 1101, 1102, and 1103. The electronic device 110 (e.g., the graphic object creation module 471) may perform the operation of comparing the resized line drawings 1100 with the line drawings 1101, 1102, and 1103.

According to an embodiment, in operation 917, the electronic device 110 may determine whether there is one identified first graphic object and, when there is one identified first graphic object (Yes in 917), display the first graphic object on the first area of the content corresponding to the position of at least one of the line drawing or marker in operation 919.

Figure 12:
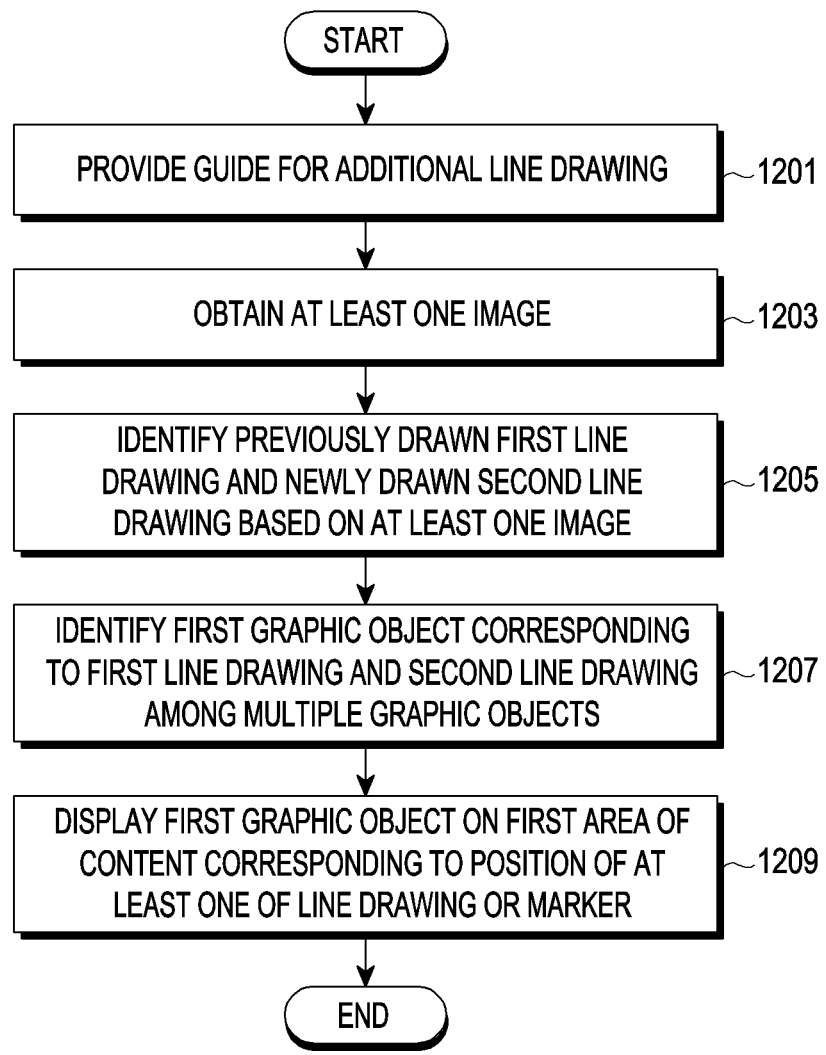
FIG. 12 is a flowchart illustrating another example of an operation of a metaverse environment implementation system according to an embodiment.

According to an embodiment, when the number of first graphic objects is not one (or when there are a plurality of first graphic objects) (No in 917), the electronic device 110 may display a screen for guiding to draw an additional line drawing (e.g., operation 1201 of FIG. 12). A detailed operation is described below in greater detail with reference to "third embodiment."

3.3. Third Embodiment <Guiding to Draw More Specific Line Drawing>

The above-described operations of the metaverse environment implementation system may be applied to the third embodiment and no detailed description thereof is thus given.

According to an embodiment, as described above in connection with the second embodiment, when there are a plurality of graphic objects identified by the line drawing and marker, the electronic device 110 may display a screen for guiding to draw a line drawing more specifically. Based on the line drawing more specifically drawn by the user, the electronic device 110 may identify a specific graphic object intended to be implemented by the user.

FIG. 12 is a flowchart illustrating another example of an operation of a metaverse environment implementation system according to an embodiment. According to an embodiment, operations of the metaverse environment implementation system are not limited in order to the operations shown in FIG. 12 and may be performed in a different order than that shown. According to an embodiment, more operations than the operations of the metaverse environment implementation system shown in FIG. 12 may be performed, or at least one fewer operations may be performed. FIG. 12 is described below with reference to FIG. 13.

Figure 13:
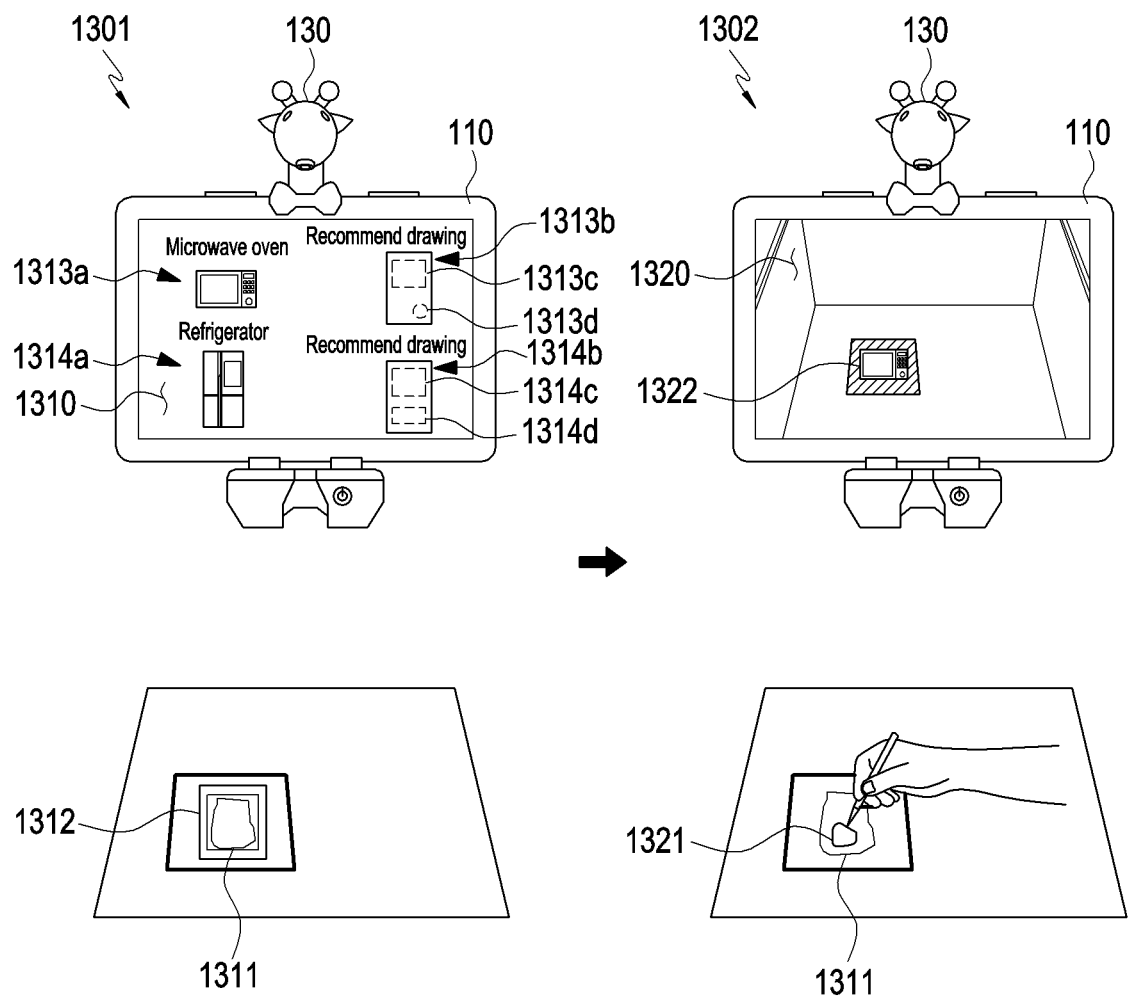
FIG. 13 is a view illustrating an example of a specific operation for guiding a drawing by an electronic device according to an embodiment.

FIG. 13 is a view illustrating an example of a specific operation for guiding a drawing by an electronic device 110 according to an embodiment.

According to an embodiment, when there is one first graphic object identified by the line drawing and marker (or when there are a plurality of first graphic objects) as described above (No in 917), the electronic device 110 may provide a guide for an additional line drawing in operation 1201. For example, referring to 1301 of FIG. 13, the electronic device 110 (e.g., the graphic object creation module 471) may identify a plurality of graphic objects (e.g., a microwave oven object and a refrigerator object) associated with the line drawing 1311 representing a rectangle and the marker 1312 representing food. Based on identifying that the plurality of graphic objects (e.g., the microwave oven object and the refrigerator object), the electronic device 110 may display a screen 1310 for guiding a line drawing with a higher (i.e., more specific) line drawing than the currently compared line drawing (e.g., rectangle) among the plurality of line drawings associated with the plurality of graphic objects (e.g., the microwave oven object and the refrigerator object) as described above in connection with Table 2. For example, referring to 1301 of FIG. 13, the screen 1310 may include information 1313b about the rectangle 1313c and the circle 1313d displayed in specific positions with respect to the line drawing (e.g., rectangle) identified as information about the line drawing with a higher level corresponding to the microwave oven object 1313a and information 1314b about the rectangles 1314c and 1314d displayed in specific positions with respect to the line drawing (e.g., rectangle) identified as information about the line drawing with a higher level corresponding to the refrigerator object 1314a. To complete the recommended line drawing for the graphic object (e.g., microwave oven object) desired to be implemented by the user according to the information 1313b and 1314b displayed on the screen 1310, the user may further draw the line drawing 1321 as shown in 1302 of FIG. 13.

According to an embodiment, in operation 1203, the electronic device 110 may obtain at least one image and, in operation 1205, identify a first line drawing 1311, drawn before, and a second line drawing 1321, newly drawn, based on at least one image.

According to an embodiment, in operation 1207, the electronic device 110 may identify the first graphic object corresponding to the first line drawing and the second line drawing among the plurality of graphic objects. For example, the electronic device 110 (e.g., the graphic object creation module 471) may identify a specific graphic object (e.g., the microwave oven object) corresponding to the first line drawing 1311 and the second line drawing 1321 among the plurality of graphic objects (e.g., the microwave oven object and the refrigerator object).

According to an embodiment, in operation 1209, the electronic device 110 may display the first graphic object on the first area of the content corresponding to the position of at least one of the line drawing or marker.

3.4. Fourth Embodiment <Setting Attribute of Implemented Graphic Object Based on Marker>

The above-described operations of the metaverse environment implementation system may be applied to the fourth embodiment and no detailed description thereof is thus given.

According to an embodiment, after the graphic object is implemented on the metaverse space, the electronic device 110 may identify that another marker is placed on the line drawing to implement the graphic object by the user. The electronic device 110 may set an attribute (e.g., color or size) corresponding to the implemented graphic object, based on the type of the placed marker.

Figure 14:
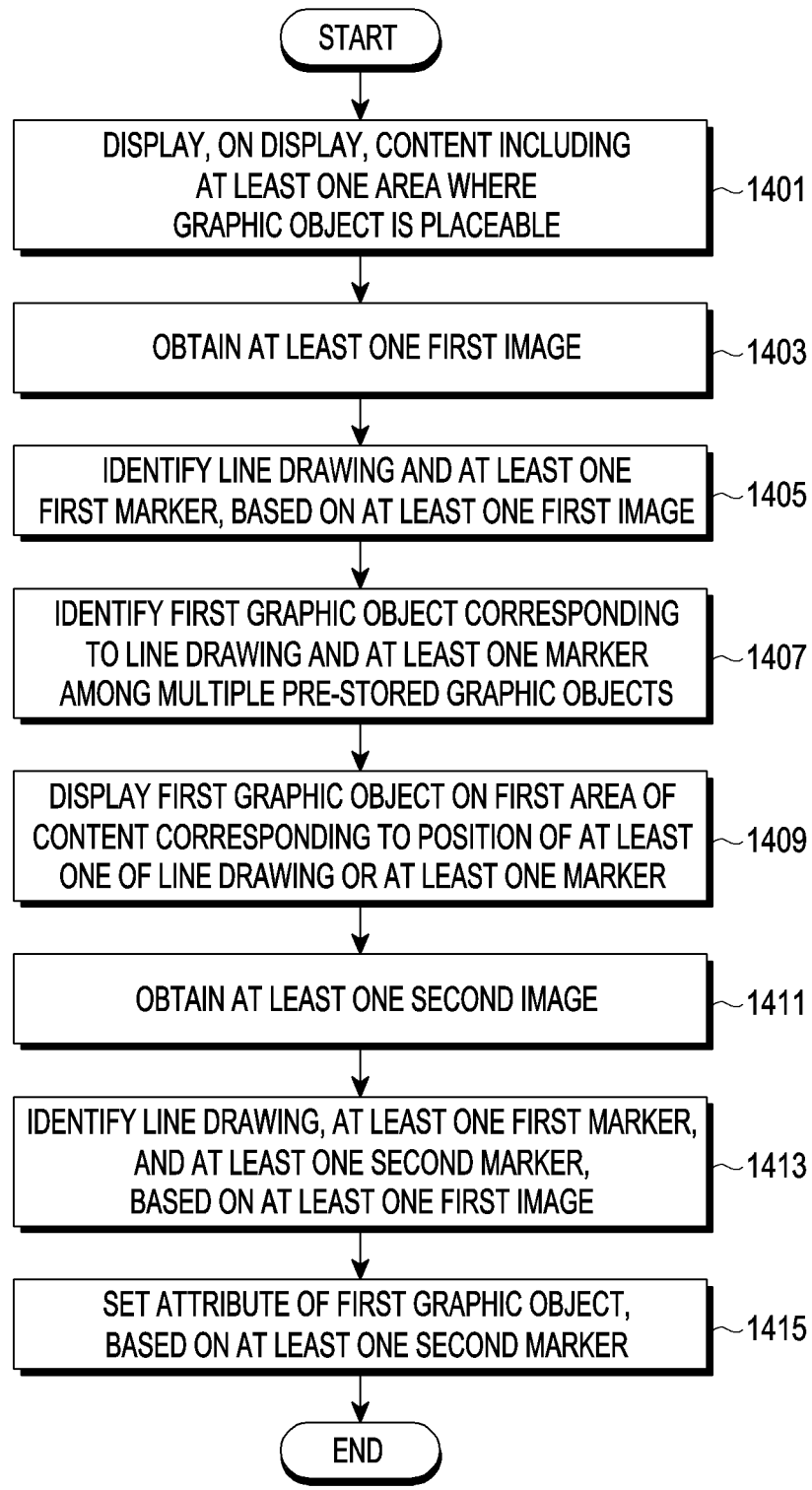
FIG. 14 is a flowchart illustrating another example of an operation of a metaverse environment implementation system according to an embodiment.

FIG. 14 is a flowchart illustrating another example of an operation of a metaverse environment implementation system according to an embodiment. According to an embodiment, operations of the metaverse environment implementation system are not limited in order to the operations shown in FIG. 14 and may be performed in a different order than that shown. According to an embodiment, more operations than the operations of the metaverse environment implementation system shown in FIG. 14 may be performed, or at least one fewer operations may be performed. FIG. 14 is described below with reference to FIGS. 15A and 15B.

Figure 15A:
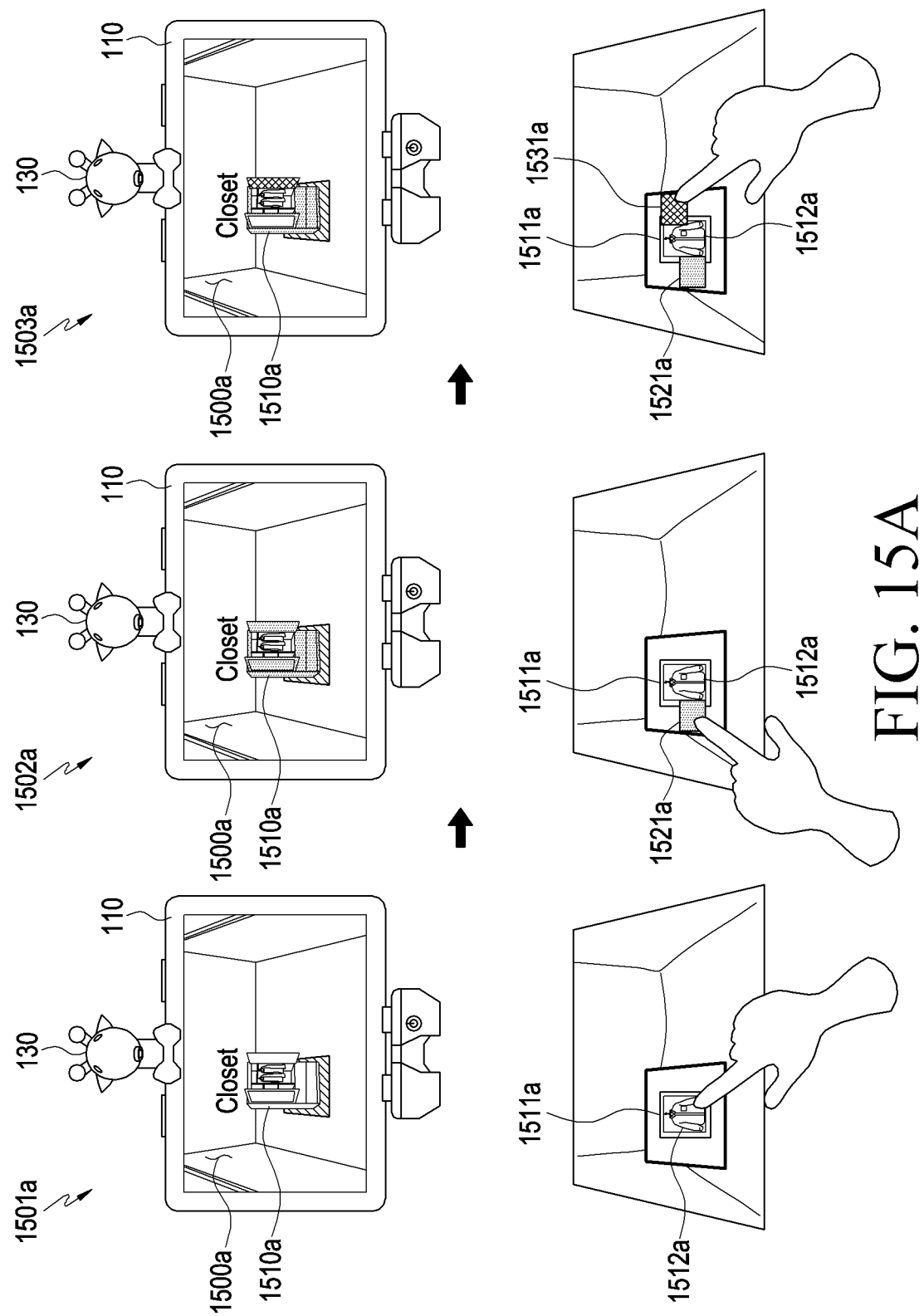
FIG. 15A is a view illustrating an example of an operation of setting an attribute (e.g., color) to a graphic object implemented on a metaverse space by an electronic device according to an embodiment.
Figure 15B:
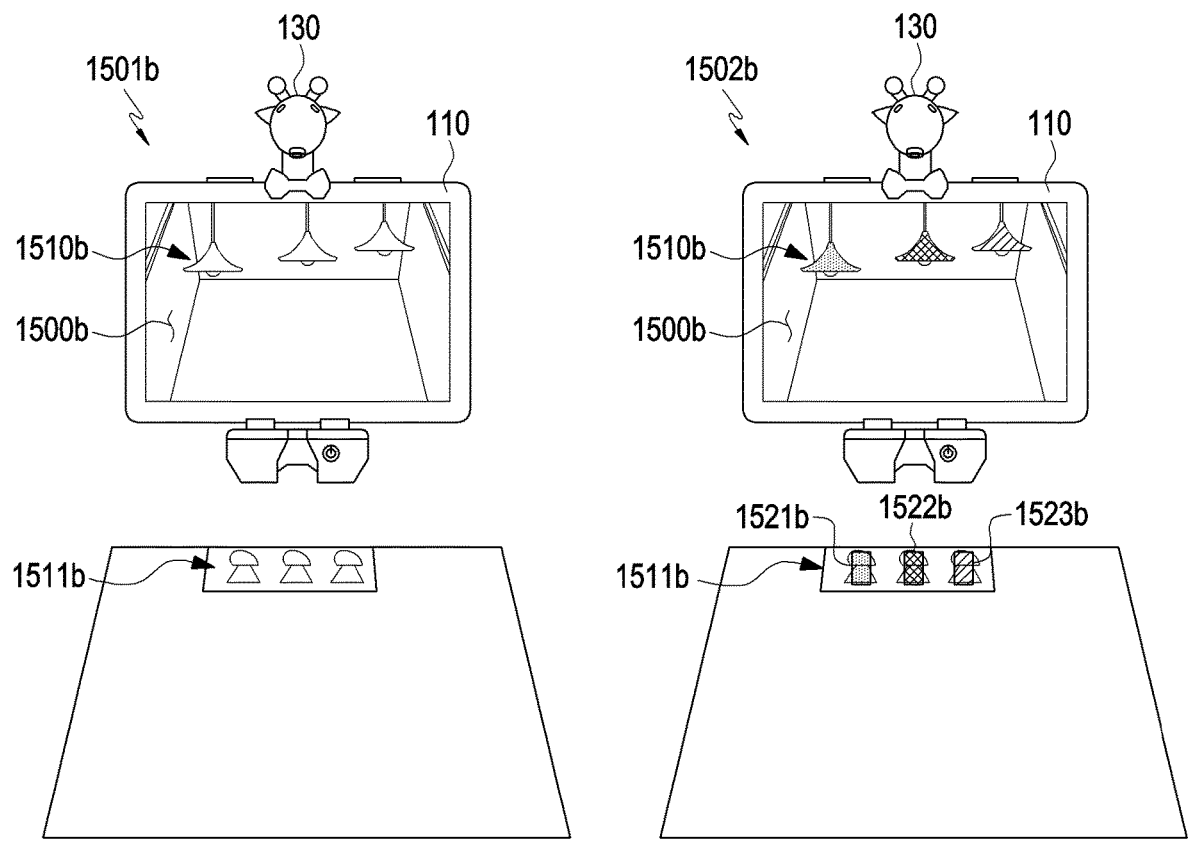
FIG. 15B is a view illustrating an example of an operation of setting an attribute (e.g., color) to a graphic object implemented on a metaverse space by an electronic device according to an embodiment.

FIG. 15A is a view illustrating an example of an operation of setting an attribute (e.g., color) to a graphic object implemented in a metaverse space by an electronic device 110 according to an embodiment. FIG. 15B is a view illustrating an example of an operation of setting an attribute (e.g., color) to a graphic object implemented in a metaverse space by an electronic device 110 according to an embodiment.

According to an embodiment, in operation 1401, the electronic device 110 may display content including at least one area where the graphic object may be placed, on the display. According to an embodiment, in operation 1403, the electronic device 110 may obtain at least one first image and, in operation 1405, identify at least one marker and line drawing based on the at least one first image. According to an embodiment, in operation 1407, the electronic device 110 may identify the first graphic object corresponding to the line drawing and at least one marker among a plurality of pre-stored graphic objects and, in operation 1409, display the first graphic object on the first area of the content corresponding to the position of at least one of the line drawing or at least one marker. For example, as shown in 1501a of FIG. 15A, the electronic device 110 may display the graphic object 1510a corresponding to the line drawing 1511a and marker 1512a identified from the image received from the mounting device 130 on the content 1500a corresponding to the metaverse space. As another example, as shown in 1501b of FIG. 15B, the electronic device 110 may display the graphic object 1510b corresponding to the line drawing 1511b identified from the image received from the mounting device 130, on the content 1500b corresponding to the metaverse space. Operations 1401 to 1409 of the electronic device 110 may be performed like operations 601 to 609 of the electronic device 110 as described above, and no duplicate description thereof is given below.

According to an embodiment, in operation 1411, the electronic device 110 may obtain at least one second image and, in operation 1413, identify the line drawing, at least one first marker, and at least one second marker based on at least one first image. For example, after the graphic objects 1510a and 1510b are implemented, as shown in FIGS. 15A and 15B, the user may place at least one marker 1521a, 1531a, 1521b, 1522b, and 1523b for setting the attribute of the graphic objects 1510a and 1510b to at least partially overlap the line drawings 1511a and 1511b for implementing the graphic objects 1510a and 1510b. The attribute may include various types of visual attributes, such as the color, size, or texture of the graphic objects 1510a and 1510b, and there may be provided types of markers respectively corresponding to the attributes. As an example, referring to FIGS. 15A and 15B, an example of placing a color marker for setting the color of the graphic objects 1510a and 1510b is described. For example, referring to 1502a and 1503a of FIGS. 15A and 1502b of FIG. 15B, the electronic device 110 (e.g., the graphic object creation module 471) may identify the color markers 1521a, 1531a, 1521b, 1522b, and 1523b as well as the markers 1512a and 1512b representing the line drawings 1511a and 1511b and object from the image received from the mounting device 130.

According to an embodiment, in operation 1415, the electronic device 110 may set the attribute of the first graphic object based on at least one second marker.

According to an embodiment, when a single marker for changing the attribute is placed, the electronic device 110 (e.g., the graphic object creation module 471) may set the attribute of the graphic object to the attribute corresponding to the placed marker. As an example, referring to 1502a of FIG. 15A, the electronic device 110 (e.g., the graphic object creation module 471) may set the color of the graphic object 1510a to the color (e.g., red) corresponding to the placed single color marker 1521a.

According to an embodiment, when a plurality of markers for changing the attribute are placed, the electronic device 110 (e.g., the graphic object creation module 471) may set the attribute of the graphic object based on the positions of the plurality of markers and the attributes. For example, when the plurality of markers are placed to be spaced apart from each other, the electronic device 110 (e.g., the graphic object creation module 471) may set the attributes of the portions of the graphic object according to the positions where the plurality of color markers are arranged on the line drawing. As an example, referring to 1503a of FIG. 15A, the electronic device 110 (e.g., the graphic object creation module 471) may identify that one color marker 1521a is placed on the left on the line drawing 1511a from the image received from the mounting device 130, and another color marker 1531a is spaced apart from the color marker 1521a and is placed on the right on the line drawing 1511a. Based on the identification, the electronic device 110 (e.g., the graphic object creation module 471) may set the color of the left portion of the graphic object 1510a to red corresponding to the color marker 1521a and set the color of the right portion of the graphic object 1510a to blue corresponding to the color marker 1531a. As another example, referring to 1502b of FIG. 15B, the electronic device 110 (e.g., the graphic object creation module 471) may set a color for each of the lights included in the light graphic object 1510b according to the color markers 1521b, 1522b, and 1523b arranged per light on the line drawing 1511b from the image received from the mounting device 130. In this case, when the position where the color marker is placed is the portion corresponding to the body of the light object of the line drawing 1511b, the electronic device 110 (e.g., the graphic object creation module 471) may set a color per body included in the light graphic object 1510b as described above and, when the position where the color marker is placed is a portion corresponding to the light output from the light object of the line drawing 1511b, set a color per light.

As another example, when a plurality of color markers overlap each other, the electronic device 110 (e.g., the graphic object creation module 471) may determine that the attribute of the graphic object is a mixed color of the colors corresponding to the plurality of color markers.

3.5. Fifth Embodiment <Providing Interaction with Graphic Object Implemented on Metaverse>

The above-described operations of the metaverse environment implementation system may be applied to the fifth embodiment and no detailed description thereof is thus given.

According to an embodiment, the electronic device 110 may move the position of the user's virtual avatar corresponding to the character marker on the metaverse space based on the position of the character marker moved by the user. When the character marker is placed to contact the line drawing and marker for implementing another graphic object, the electronic device 110 may display the position of the virtual avatar to contact the other graphic object on the metaverse space and may display an animation corresponding to the graphic object contacting the virtual avatar. Thus, the user may have the same experience as she has in the real world by allowing the virtual avatar to interact with the virtual object.

Figure 16:
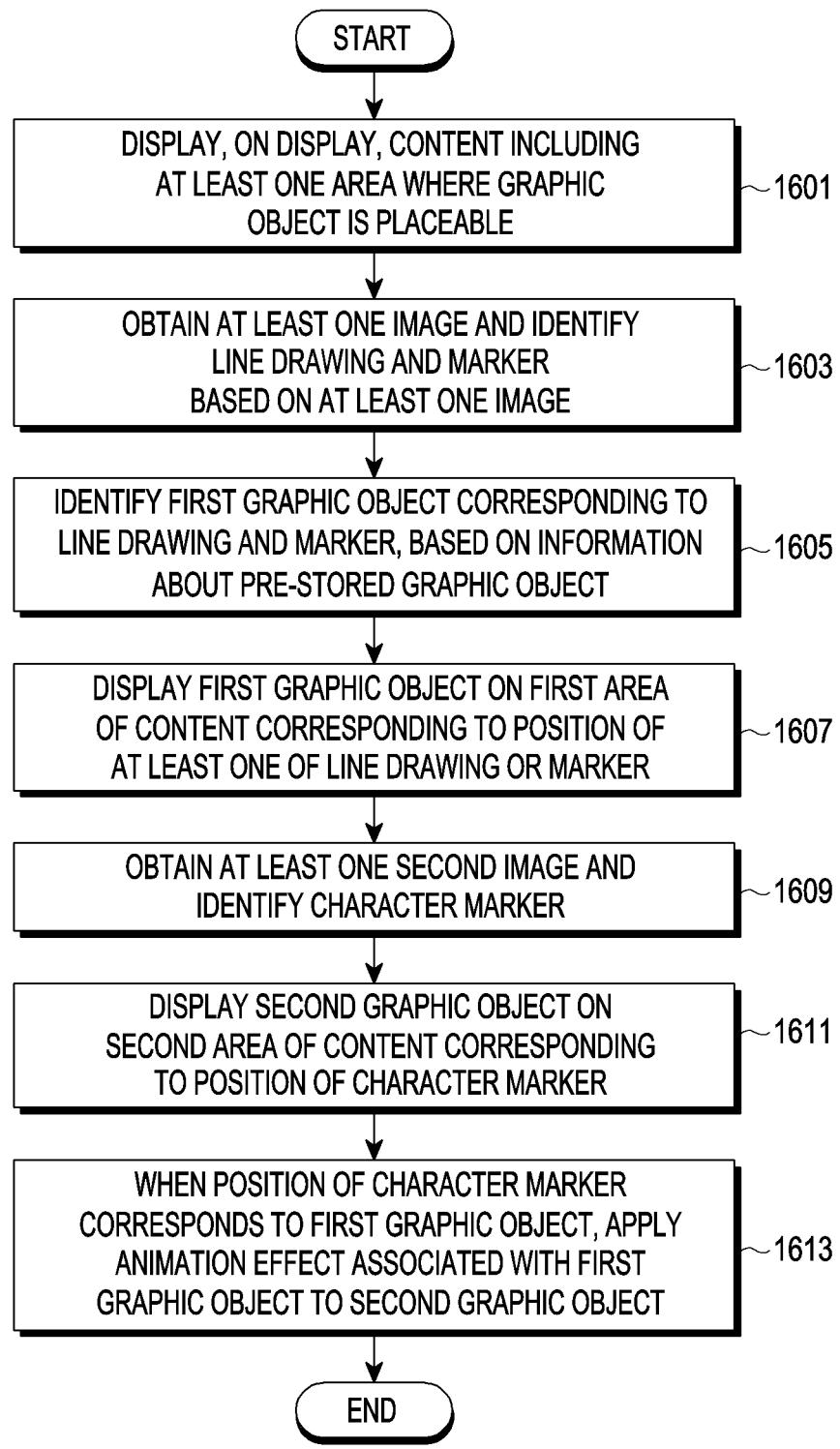
FIG. 16 is a flowchart illustrating another example of an operation of a metaverse environment implementation system according to an embodiment.

FIG. 16 is a flowchart illustrating another example of an operation of a metaverse environment implementation system according to an embodiment. According to an embodiment, operations of the metaverse environment implementation system are not limited in order to the operations shown in FIG. 16 and may be performed in a different order than that shown. According to an embodiment, more operations than the operations of the metaverse environment implementation system shown in FIG. 16 may be performed, or at least one fewer operations may be performed. FIG. 16 is described below with reference to FIG. 17.

Figure 17:
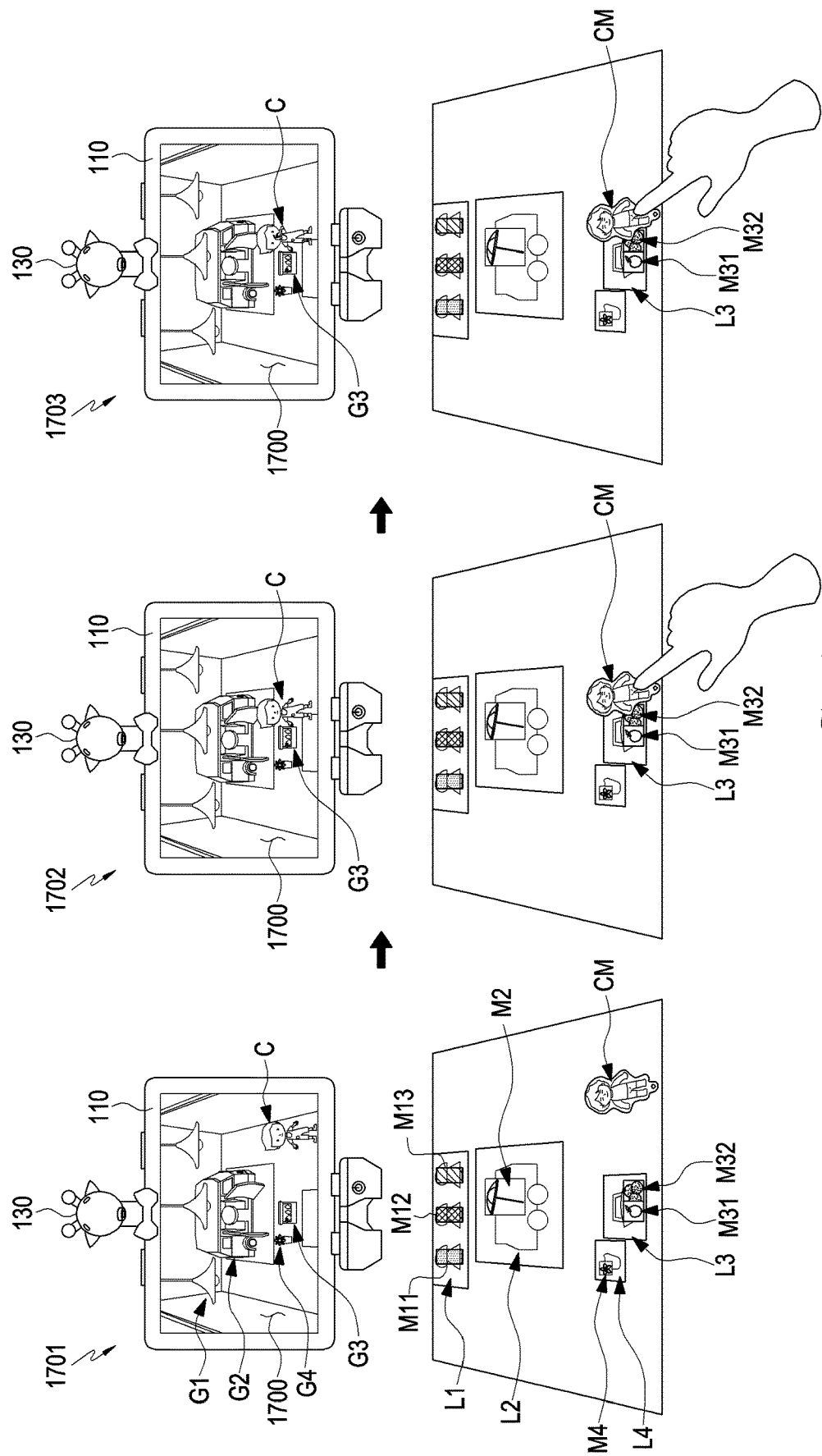
FIG. 17 is a view illustrating an example of an operation of providing interaction with a graphic object implemented in a metaverse by an electronic device according to an embodiment.

FIG. 17 is a view illustrating an example of an operation of providing interaction with a graphic object implemented in a metaverse by an electronic device 110 according to an embodiment.

According to an embodiment, in operation 1601, the electronic device 110 may display content including at least one area where the graphic object may be placed, on the display. According to an embodiment, in operation 1603, the electronic device 110 may obtain at least one image and identify the line drawing and marker based on the at least one image and, in operation 1605, identify the first graphic object corresponding to the line drawing and marker based on information about the pre-stored graphic object. In operation 1607, the electronic device 110 may display the first graphic object on the first area of the content corresponding to the position of at least one of the line drawing or marker. For example, referring to 1701 of FIG. 17, the electronic device 110 may display, on the content 1700 corresponding to the metaverse space, the light object G1 corresponding to the line drawing L1 representing the light and color markers M11, M12, and M13, the camping car object G2 associated with the marker M2 representing the parasol and the line drawing L2 representing the car, the basket object G3 containing fruits associated with the marker M31 and M32 representing fruits and the line drawing L3 representing the basket, and the flowerpot object G4 with flowers associated with the marker M4 representing flowers and the line drawing L4 representing the flowerpot. Operations 1601 to 1607 of the electronic device 101 may be performed like operations 601 to 609 of the electronic device 101 as described above, and no duplicate description thereof is given below.

According to an embodiment, in operation 1609, the electronic device 110 may obtain at least one second image and identify the character marker and, in operation 1611, display the second graphic object on the second area of the content corresponding to the position of the character marker. For example, the electronic device 110 may display a virtual avatar C corresponding to the character marker CM placed by the user from the image received from the mounting device 130. As described above, the electronic device 110 may display the virtual avatar C corresponding to the character marker CM on the area of the content 1700 corresponding to the position where the character marker CM is placed.

According to an embodiment, in operation 1613, when the position of the character marker corresponds to the first graphic object, the electronic device 110 may apply an animation effect associated with the first graphic object to the second graphic object. For example, as shown in 1702 of FIG. 17, when the character marker CM is moved, the electronic device 110 may display the virtual avatar C to the area of the content 1700 corresponding to the moved position of the character marker CM based on the image received in real-time from the mounting device 130. Upon identifying that the moved position of the character marker CM overlaps the line drawing L3 corresponding to the specific graphic object (e.g., the fruit basket object G3), the electronic device 110 may apply an animation effect associated with the specific graphic object (e.g., the fruit basket object G3) to the virtual avatar C and display the same. As an example, the electronic device 110 may apply and display such an animation effect as if the virtual avatar C eats the fruits contained in the fruit basket object G3.

According to an embodiment, the electronic device 110 may apply and display the animation effect to the virtual avatar C based on information (e.g., information about the marker placed on the line drawing L3) associated with the line drawing L3 corresponding to the specific graphic object (e.g., the fruit basket object G3). For example, referring to 1702 and 1703 of FIG. 17, the electronic device 110 may apply such a motion as if the virtual avatar C eats the fruits corresponding to the fruit markers M31 and M32 placed on the line drawing L3 corresponding to the fruit basket object G3.

3.5. Sixth Embodiment <Registering and Selling Virtual Objects Implemented in Metaverse Space>

The above-described operations of the metaverse environment implementation system may be applied to the sixth embodiment and no detailed description thereof is thus given.

According to an embodiment, the electronic device 110 may register information about the metaverse space where virtual objects implemented by the line drawing drawn by the user and markers, with the server 120 and sell the implemented virtual objects when another user accesses the metaverse space based on the registered information.

Figure 18:
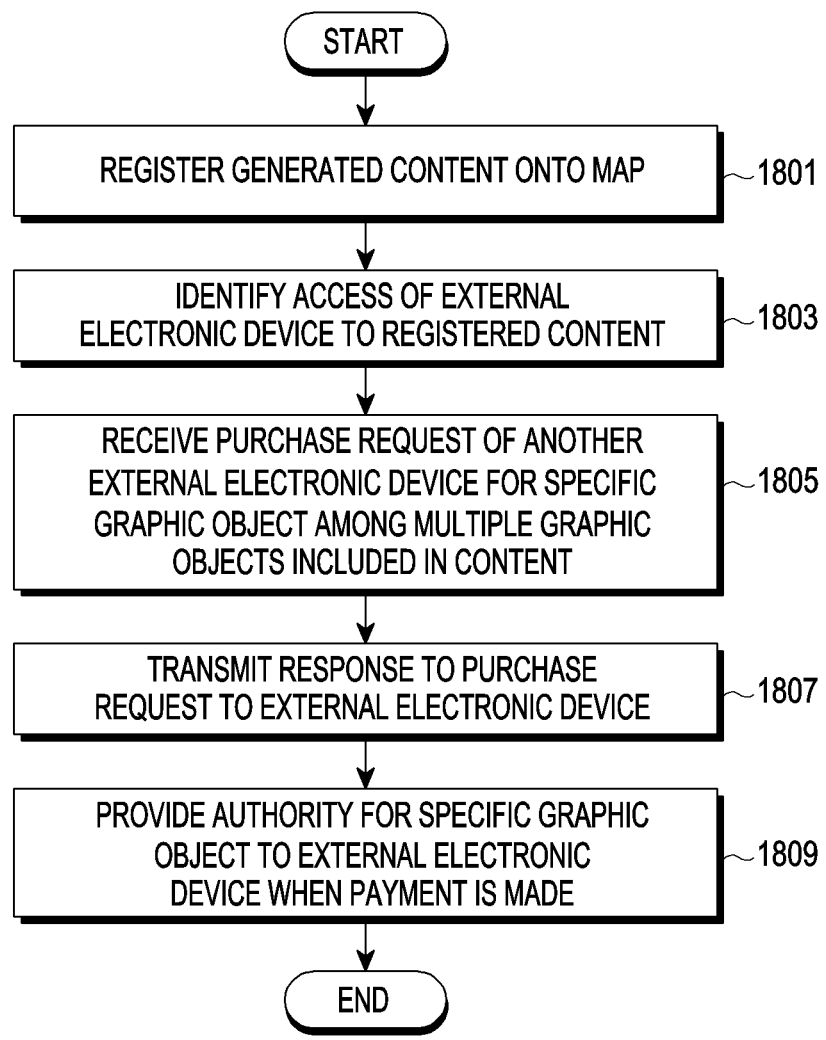
FIG. 18 is a flowchart illustrating another example of an operation of a metaverse environment implementation system according to an embodiment.

FIG. 18 is a flowchart illustrating another example of an operation of a metaverse environment implementation system according to an embodiment.

According to an embodiment, operations of the metaverse environment implementation system are not limited in order to the operations shown in FIG. 18 and may be performed in a different order than that shown. According to an embodiment, more operations than the operations of the metaverse environment implementation system shown in FIG. 18 may be performed, or at least one fewer operations may be performed. FIG. 18 is described below with reference to FIGS. 19 and 20.

Figure 19:
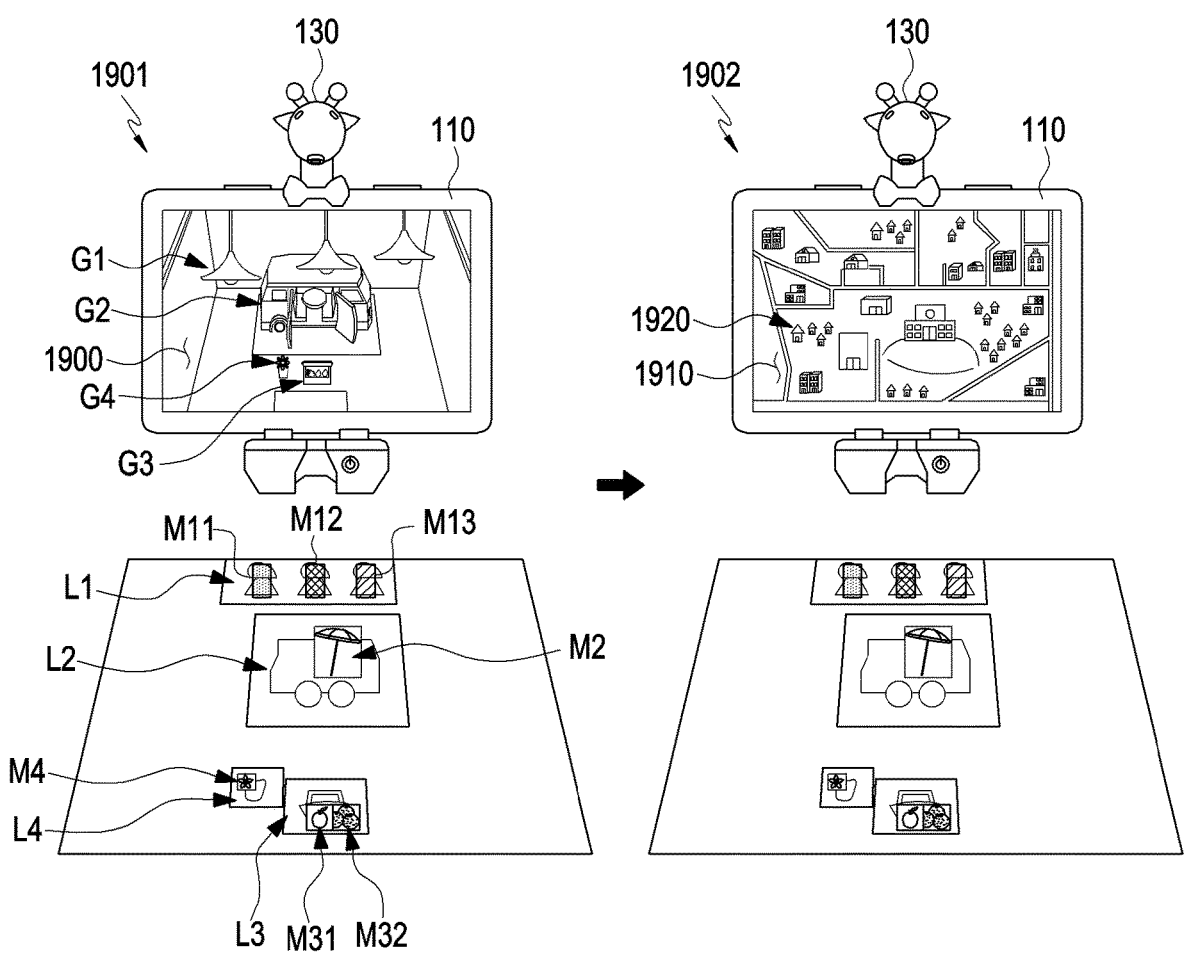
FIG. 19 is a view illustrating an example of an operation of registering content corresponding to a metaverse space by an electronic device according to an embodiment.
Figure 20A:
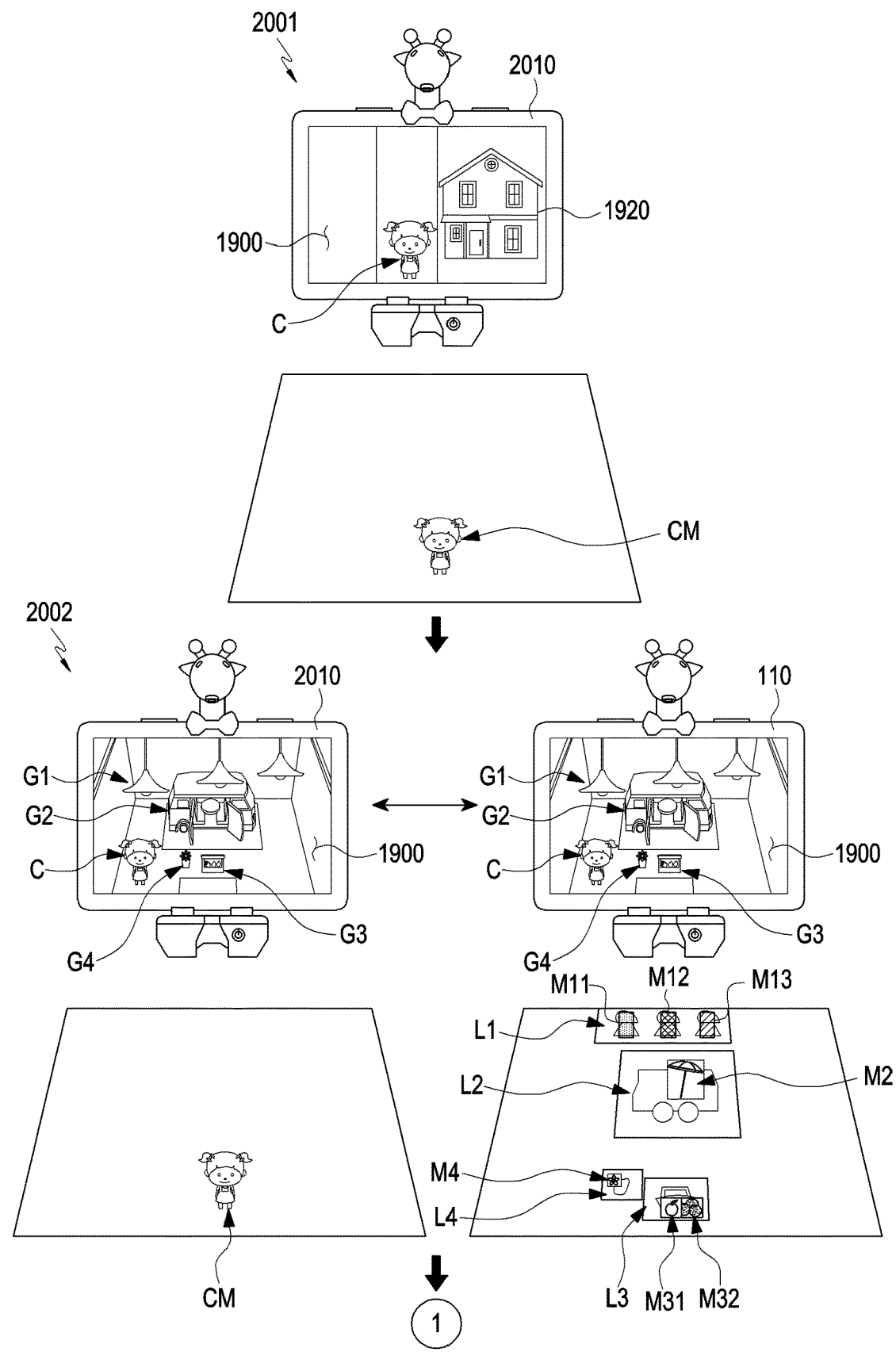
FIG. 20A is a view illustrating an example of an operation of selling a graphic object registered on a metaverse space by an electronic device according to an embodiment.
Figure 20B:
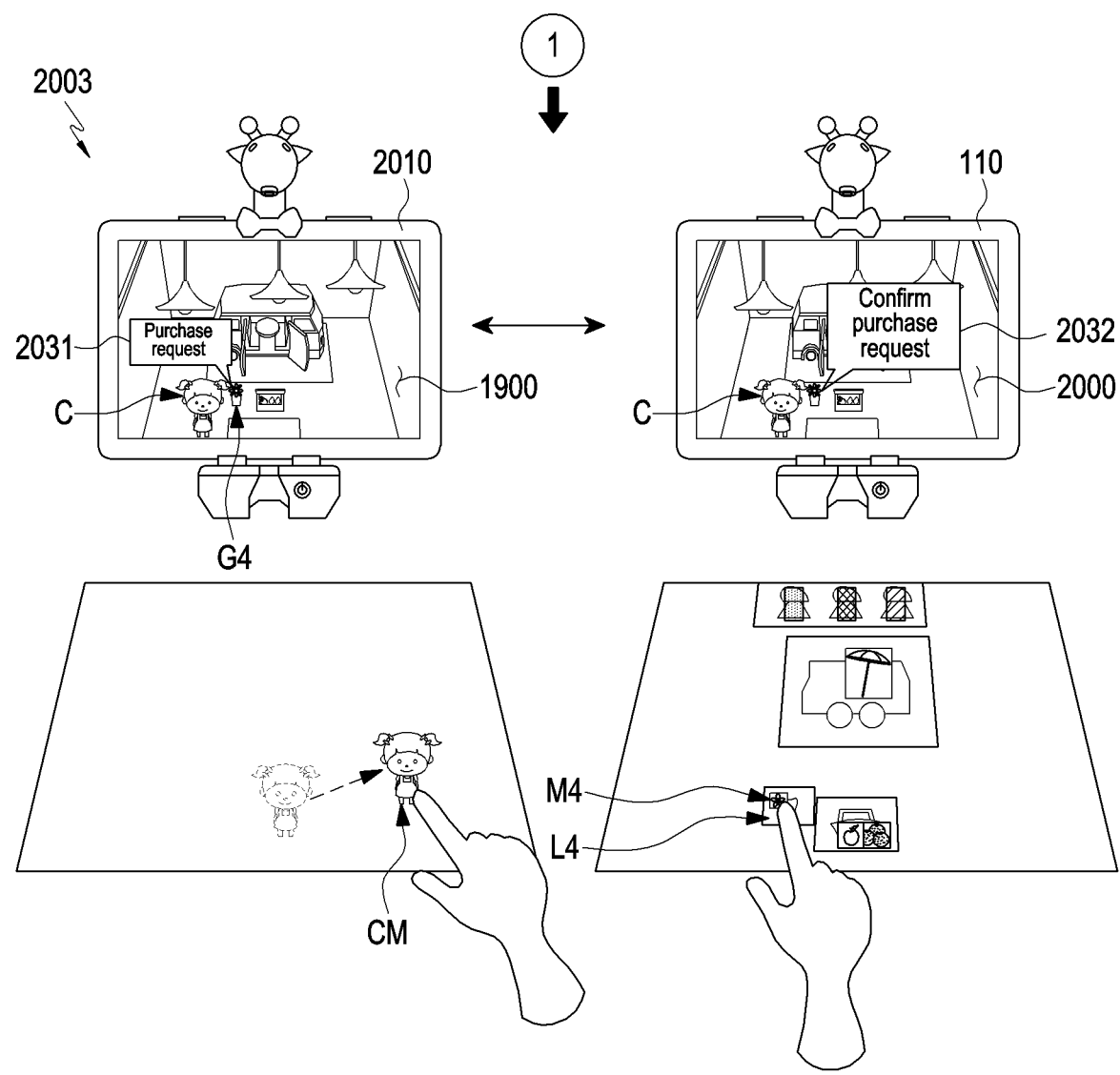
FIG. 20B is a view illustrating an example of an operation of selling a graphic object registered on a metaverse space by an electronic device according to an embodiment.

FIG. 19 is a view illustrating an example of an operation of registering content corresponding to a metaverse space by an electronic device 110 according to an embodiment. FIG. 20A is a view illustrating an example of an operation of selling a graphic object registered on a metaverse space by an electronic device 110 according to an embodiment. FIG. 20B is a view illustrating an example of an operation of selling a graphic object registered on a metaverse space by an electronic device 110a according to an embodiment.

According to an embodiment, in operation 1801, the electronic device 110 may register generated content on a map. For example, referring to 1901 of FIG. 19, the electronic device 110 may display, on the content 1900 corresponding to the metaverse space, the light object G1 corresponding to the line drawing L1 representing the light and color markers M11, M12, and M13, the camping car object G2 associated with the marker M2 representing the parasol and the line drawing L2 representing the car, the basket object G3 containing fruits associated with the marker M31 and M32 representing fruits and the line drawing L3 representing the basket, and the flowerpot object G4 with flowers associated with the marker M4 representing flowers and the line drawing L4 representing the flowerpot. Operation 1801 of the electronic device 101 may be performed like operations 601 to 609 of the electronic device 101 as described above, and no duplicate description thereof is given below.

The electronic device 110 may register, in the map 1910 of the server 120, content 1900 including information about (e.g., type and position) a plurality of graphic objects G1, G2, G3, and G4 generated automatically and/or by receiving the user's request (e.g., selection on the menu displayed on the display). In this case, the plurality of registered graphic objects G1, G2, G3, and G4 may be assigned an authority (e.g., non-fungible token (NFT)) for only the user having implemented the graphic objects to use them. As a result, a virtual home 1920 corresponding to the content 1900 representing the inside of the room may be registered in a specific position on the virtual map 1910 in the server 120.

According to an embodiment, in operation 1803, the electronic device 110 may identify access of an external electronic device to the registered content. For example, referring to 2001 of FIG. 20A, another external electronic device 2010 may move the virtual character C corresponding to the character marker CM positioned on the map 1920 as another user moves the character marker CM. When the virtual character is positioned in the registered home 1910, the external electronic device 2010 may access the content 1900 and establish a communication connection with the electronic device 110 which has registered the content 1900. The electronic device 110 may identify access of the external electronic device 2010 to the content 1900 and establish a communication connection with the external electronic device 2010. As shown in 2002 of FIG. 20A, the electronic device 110 and the external electronic device 2010 both may display the registered content 1900 and another user's virtual avatar C.

According to an embodiment, in operation 1805, the electronic device 110 may receive a purchase request for a specific graphic object among the plurality of graphic objects included in the content, from another external electronic device and, in operation 1807, transmit a response to the purchase request to the external electronic device. For example, as shown in 2003 of FIG. 20B, as the user of the external electronic device 2010 moves the character marker CM, the virtual avatar C may be moved on the registered content 1900. When the other user's virtual avatar C contacts a specific graphic object G4, the electronic device 110 may receive a purchase request message 2031 from the external electronic device 2010. The electronic device 110 may display a notification 2032 for identifying the purchase request on the display based on the received purchase request message 2031. As a response to the purchase request, the electronic device 110 may identify a gesture of the user of the electronic device 110 to touch the line drawing L3 and/or the marker M4 to implement the graphic object G4 based on the image received from the mounting device. Accordingly, the electronic device 110 may transmit a response message to accept the purchase request to the external electronic device 2010.

According to an embodiment, in operation 1809, when payment is made, the electronic device 110 may provide an authority for the specific graphic object to the external electronic device. For example, as a cost for the graphic object, the electronic device 110 may request the external electronic device 2010 to make a payment by cash, card, and/or virtual currency (e.g., coins) available in the metaverse space. When the payment is performed, an authority (e.g., a non-fungible token (NFT) may be imparted to the user of the external electronic device 2010 by the server 120 for the user of the external electronic device 2010 to use the graphic objects G4. Therefore, the external electronic device 2010 may perform the operation of arranging the purchased graphic objects G4 in the metaverse space implemented by the user according to the user's control.

What is claimed is:

1. A method for operating an electronic device, the method comprising:
    displaying, on a display of the electronic device, a content including at least one area where a graphic object is placeable;
    obtaining, using a camera of the electronic device, at least one image;
    identifying a line drawing and a marker from the at least one image, the line drawing including a line drawn on a real paper by a user, the marker including an image representing a real object, wherein at least a portion of the marker overlaps at least a portion of the line drawing;
    identifying, among a plurality of pre-stored graphic objects, a first graphic object corresponding to a combination of a figure which the identified line drawing represents and the real object which the image included in the identified marker represents; and
    displaying the first graphic object on a first area of the content corresponding to a position of at least one of the line drawing or the marker,
    wherein the at least one image is not displayed on the display.

2. The method of claim 1,
    wherein the electronic device stores information about a first line drawing and at least one first marker associated with each of the plurality of graphic objects, and
    wherein the method further comprises identifying the first graphic object among the plurality of graphic objects, based on comparison between the information about the first line drawing and the at least one first marker and the information about the line drawing and the marker.

3. The method of claim 1, further comprising:
    obtaining at least one first image after displaying the first graphic object;
    identifying at least one color marker placed on the line drawing from the at least one first image; and
    setting a color of the first graphic object based on the at least one identified color marker.

4. The method of claim 3, further comprising:
    identifying a position of the at least one color marker placed on the line drawing; and
    setting the color of a portion of the first graphic object corresponding to the position.

5. The method of claim 4, further comprising:
    obtaining at least one second image after displaying the first graphic object;
    identifying a character marker from the at least one second image and displaying a virtual avatar corresponding to the character marker on the content; and
    when a position of the character marker corresponds to the line drawing, applying an animation effect associated with the first graphic object to the virtual avatar.

6. The method of claim 5, further comprising determining the animation effect based on information about the at least one-marker.

7. The method of claim 1, further comprising:
    registering the content with a server, wherein an authority for using the first graphic object is set;
    identifying access, to the content, of an external electronic device;
    receiving a purchase request for the first graphic object by the external electronic device; and
    selling the first graphic object based on the purchase request, wherein the authority for using the first graphic object is set to the external electronic device.

8. A non-transitory computer-readable medium storing a program code executable by a processor of an electronic device, wherein when executed, the program code enables the processor to:
    display, on a display of the electronic device, a content including at least one area where a graphic object is placeable;
    obtain, using a camera of the electronic device, at least one image;
    identify a line drawing and a marker from the at least one image, the line drawing including a line drawn on a real paper by a user, the marker including an image representing a real object, wherein at least a portion of the marker overlaps at least a portion of the line drawing;
    identify, among a plurality of pre-stored graphic objects, a first graphic object corresponding to a combination of a figure which the identified line drawing represents and the real object which the image included in the identified marker represents; and
    display the first graphic object on a first area of the content corresponding to a position of at least one of the line drawing or the marker,
    wherein the at least one image is not displayed on the display.

9. The non-transitory computer-readable medium of claim 8, storing information about a first line drawing and at least one first marker associated with each of the plurality of graphic objects, and wherein when executed, the program code enables the processor to identify the first graphic object among the plurality of graphic objects based on comparison between the information about the first line drawing and the at least one first marker and the information about the line drawing and the marker.

10. The non-transitory computer-readable medium of claim 8, wherein when executed, the program code enables the processor to:
    obtain at least one first image after displaying the first graphic object;
    identify at least one color marker placed on the line drawing from the at least one first image; and
    set a color of the first graphic object based on the at least one identified color marker.

11. The non-transitory computer-readable medium of claim 10, wherein when executed, the program code enables the processor to:
    identify a position of the at least one color marker placed on the line drawing; and
    set the color of a portion of the first graphic object corresponding to the position.

12. The non-transitory computer-readable medium of claim 11, wherein when executed, the program code enables the processor to:
    obtain at least one second image after displaying the first graphic object;
    identify a character marker from the at least one second image and display a virtual avatar corresponding to the character marker on the content; and
    when a position of the character marker corresponds to the line drawing, apply an animation effect associated with the first graphic object to the virtual avatar.

* * * * *